(12) United States Patent  
Siao

(10) Patent No.: US 12,329,275 B2  
(45) Date of Patent: Jun. 17, 2025

(54) FOLDING STORAGE CABINET

(71) Applicant: JING SI PURELAND CO., LTD., Taipei (TW)

(72) Inventor: Marshall Q. Siao, Xincheng Township, Hualien County (TW)

(73) Assignee: JING SI PURELAND CO., LTD., Taipei (TW)

( * ) Notice: Subject to any disclaimer, the term of this patent is extended or adjusted under 35 U.S.C. 154(b) by 134 days.

(21) Appl. No.: 18/376,265

(22) Filed: Oct. 3, 2023

(65) Prior Publication Data

US 2024/0108128 A1    Apr. 4, 2024

(30) Foreign Application Priority Data

Oct. 4, 2022   (TW) ................................. 111137659

(51) Int. Cl.
| | |
|---|---|
| *A47B 43/00* | (2006.01) |
| *A47B 87/02* | (2006.01) |
| *B62B 1/00* | (2006.01) |
| *B62B 1/12* | (2006.01) |
| *B62B 3/02* | (2006.01) |
| *A47B 61/00* | (2006.01) |
| *A47B 87/00* | (2006.01) |

(52) U.S. Cl.
CPC .......... *A47B 43/00* (2013.01); *A47B 87/0276* (2013.01); *A47B 87/0292* (2013.01); *B62B 1/006* (2013.01); *B62B 1/12* (2013.01); *A47B 61/00* (2013.01); *A47B 87/008* (2013.01); *B62B 1/008* (2013.01); *B62B 2205/04* (2013.01)

(58) Field of Classification Search
CPC . A47B 43/00; A47B 87/0276; A47B 87/0292; B62B 1/006; B62B 1/12; B62B 2205/04; B62B 3/025; B62B 5/067; A45B 5/14
See application file for complete search history.

(56) References Cited

U.S. PATENT DOCUMENTS

| | | | |
|---|---|---|---|
| 6,431,580 B1 * | 8/2002 | Kady | ...................... B62B 1/125 |
| | | | 280/655 |
| 9,010,549 B2 | 4/2015 | Krohn | |
| 12,103,576 B2 * | 10/2024 | Elden | ...................... B62B 3/025 |

(Continued)

FOREIGN PATENT DOCUMENTS

| | | |
|---|---|---|
| CN | 202653541 U | 1/2013 |
| CN | 208446984 U | 2/2019 |

(Continued)

*Primary Examiner* — Kimberley S Wright  
(74) *Attorney, Agent, or Firm* — ScienBiziP, P.C.

(57) ABSTRACT

A folding storage cabinet is provided. The folding storage cabinet includes a back plate, two folding side plates, a frame, a bottom plate, and a top plate. Left and right sides of the back plate are respectively pivoted with one side of each of the two folding side plates, and the other side of each of the two folding side plates are pivoted with two sides of the frame. The folding side plates are capable of being bent to folded, such that the back plate may be close to the frame after the two folding side plates are folded, and the top plate and the bottom plate are respectively pivoted with the top portion and bottom portion of the back plate. The top plate and the bottom plate may be opened and closed relative to the back plate.

10 Claims, 34 Drawing Sheets

(56) References Cited

U.S. PATENT DOCUMENTS

| | | | |
|---|---|---|---|
| 2002/0171228 A1* | 11/2002 | Kady | A01K 97/06 280/655 |
| 2004/0075248 A1* | 4/2004 | Elden | B62B 1/12 280/651 |
| 2006/0186624 A1* | 8/2006 | Kady | B62B 1/125 280/47.33 |
| 2006/0186642 A1* | 8/2006 | Kady | A01K 97/06 280/652 |
| 2009/0145913 A1* | 6/2009 | Panosian | B62B 1/12 220/666 |
| 2016/0015172 A1* | 1/2016 | Zelek | A47B 57/10 211/149 |
| 2017/0001654 A1* | 1/2017 | Obrien | B62B 1/14 |
| 2020/0037758 A1* | 2/2020 | Kagan | A47B 43/00 |
| 2021/0206414 A1* | 7/2021 | Elden | B62B 5/026 |
| 2021/0267368 A1* | 9/2021 | Bruins | F16B 12/38 |

FOREIGN PATENT DOCUMENTS

| | | |
|---|---|---|
| CN | 210249029 U | 4/2020 |
| CN | 210300103 U | 4/2020 |
| CN | 112056821 A | 12/2020 |
| JP | 2002130927 A | 5/2022 |
| WO | 2022105018 A1 | 5/2022 |

\* cited by examiner

200

300

400

500

FOLDING STORAGE CABINET

CROSS-REFERENCE TO RELATED APPLICATION(S)

The present application claims the benefit of and priority to Taiwan Patent Application Serial No. 111137659, filed on Oct. 4, 2022, entitled "FOLDING STORAGE CABINET", the contents of which are hereby incorporated herein fully by reference into the present application for all purposes.

FIELD

The present disclosure generally relates to a storage cabinet and, more particularly, to a folding storage cabinet.

BACKGROUND

The conventional storage box structure commonly includes a box body and a box cover that are combinable. Due to the fixed structure of the box body, it may not be folded, which takes up a lot of space and causes inconvenience in collection, transportation, and use. The application of storage cabinets is extremely widespread, and they may be found in almost every office or household setting, both domestically and internationally. Currently, the design of storage cabinets is mainly based on separate designs according to the different requirements of users and environments, with almost no universal storage cabinet available. Therefore, storage cabinets have significant specificity (e.g., student storage cabinets, household clothing storage cabinets, refrigerated storage cabinets, etc.) and limitations, and are only suitable for specific locations. However, as the demand for living space increases, relying solely on large storage cabinets is no longer sufficient to meet the needs of daily life. As a result, convenient small storage cabinets have emerged (e.g., small children's storage cabinets, plastic small storage cabinets, etc.). Furthermore, in many supermarkets and entertainment venues, automated storage cabinets have been designed to facilitate customer access to belongings. Although these designs meet usage requirements in certain environments, these storage cabinets still require a significant amount of space when not in use, especially in environments with limited space (e.g., households), where the issue of space occupation becomes more prominent.

SUMMARY

In view of the above, it is necessary to provide a storage cabinet which may be conveniently stored when not in use, and may be stacked for increased storage space when in use.

In a first aspect of the present disclosure, a folding storage cabinet is provided. The folding cabinet includes a frame; a back plate located at an opposite side of the frame, a bottom portion of one of the frame and the back plate formed with at least one bottom pivot part, a top portion of other one of the frame and the back plate formed with at least one top pivot part; two folding side plates, each located between the frame and the back plate, pivotally connected to the back plate and the frame, such that the two folding side plates are foldable in a flat manner; a bottom plate, one side of the bottom plate formed with at least one bottom plate pivot part, and the bottom plate being pivotally connected to the at least one bottom pivot part through the at least one bottom plate pivot part; and a top plate, including: a cover plate, one side of the cover plate formed with at least one first cover plate pivot part, two other opposite sides each formed with at least one second cover plate pivot part, and the at least one first cover plate pivot part pivotally connected to the at least one top pivot part; and two wing plates, one side of each of the two wing plates corresponding to the two second cover plate pivot parts of the cover plate and formed with at least one wing plate pivot part, and the at least one wing plate pivot part pivotally connected to the at least one second cover plate pivot part to allow the two wing plates to be folded towards the cover plate, such that the top plate is foldable through the at least one first cover plate pivot part and the at least one top pivot part to the other one of the frame and the back plate.

In an implementation of the first aspect of the present disclosure, the folding storage cabinet further including a door plate, one side of the door plate formed with at least one door plate pivot part, one side of the frame facing the at least one door plate pivot part formed with at least one second frame pivot part, and the at least one door plate pivot part correspondingly and pivotally connected with the at least one second frame pivot part, such that the door plate opens and closes relative to the frame.

In an implementation of the first aspect of the present disclosure, where each of the two folding side plates includes a first side plate and a second side plate, at least one first side plate pivot part is formed on one side of the first side plate, at least one third side plate pivot part is formed on another side of the first side plate, at least one second side plate pivot part is formed on one side of the second side plate, at least one fourth side plate pivot part is formed on another side of the second side plate corresponding to the at least one third side plate pivot part, and the at least one third side plate pivot part is correspondingly and pivotally connected to the at least one fourth side plate pivot part, such that the first side plate is foldable in a flat manner against the second side plate.

In an implementation of the first aspect of the present disclosure, where at least one first fixing piece and at least one second fixing piece are formed on a side of the folding storage cabinet, the at least one first fixing piece is on the back plate, the at least one second fixing piece is on the frame, at least one third fixing piece and at least one fourth fixing piece are formed on another side of the folding storage cabinet, the at least one third fixing piece is on the back plate, the at least one fourth fixing piece is on the frame, and the first fixing piece and the second fixing piece of the folding storage cabinet are configured to assemble with a third fixing piece and a fourth fixing piece of another folding storage cabinet, such that a plurality of folding storage cabinets is stably arranged side by side.

In an implementation of the first aspect of the present disclosure, where the door plate is formed with a latch hole, the frame is formed with a first through hole corresponding to the latch hole, and the top plate is formed with a second through hole corresponding to the first through hole, the door plate further comprises a latch, one end of the latch is formed with a lock hole, and the latch is configured to pass through the first through hole and the second through hole after being inserted into the latch hole, to prevent the top plate from being lifted by the latch, and a corresponding lock hole is formed at a position on the frame corresponding to the lock hole, and the latch hole of the latch and the corresponding lock hole are configured to be secured with a lock to prevent the latch from being pulled out.

In an implementation of the first aspect of the present disclosure, further including at least one laminate, where each of two sides of the at least one laminate is formed with a plurality of top supporting parts, each of the two folding side plates is formed with a plurality of corresponding top supporting parts corresponding to the plurality of top supporting parts, and the at least one laminate is configured to pressed against the plurality of corresponding top supporting parts through the plurality of top supporting parts at the two sides, such that the at least one laminate is horizontally positioned between the two folding side plates.

In an implementation of the first aspect of the present disclosure, further including a hanging rod, where two ends of the hanging rod are each formed with a fixing hole, the two folding side plates are each formed with a fixed part corresponding to one of the two ends of the hanging rod, and the hanging rod is configured to be fixed to the fixed part through the fixing hole on both of the two ends of the hanging rod, such that the hanging rod is horizontally positioned between the two folding side plates; and the door plate comprises a slot for clamping the hanging rod.

In an implementation of the first aspect of the present disclosure, where each of two bottom sides of the back plate comprises a wheel, and each of two top sides of the back plate comprises a groove, and the groove is configured to accommodate a wheel of another folding storage cabinet when a plurality of the folding storage cabinets are stacked.

In an implementation of the first aspect of the present disclosure, in a case that the one of the frame and the back plate and the other one of the frame and the back plate are identical, the at least one top pivot part and the at least one bottom pivot part are located in the same one of the frame and the back plate, and in a case that the one of the frame and the back plate and the other one of the frame and the back plate are different, the at least one top pivot part is located in the one of the frame and the back plate, and the at least one bottom pivot part is located in other one of the frame and the back plate.

In an implementation of the first aspect of the present disclosure, when the top plate is folded, the two wing plates are folded towards the cover plate, such that the top plate is accommodated in the other one of the frame and the back plate, and when the top plate covers a storage space of the folding storage cabinet, such that the top plate rests on the two folding side plates.

BRIEF DESCRIPTION OF THE DRAWINGS

The present disclosure will be better understood from the following detailed description read in light of the accompanying drawings, where.

DETAILED DESCRIPTION

Figure 1:
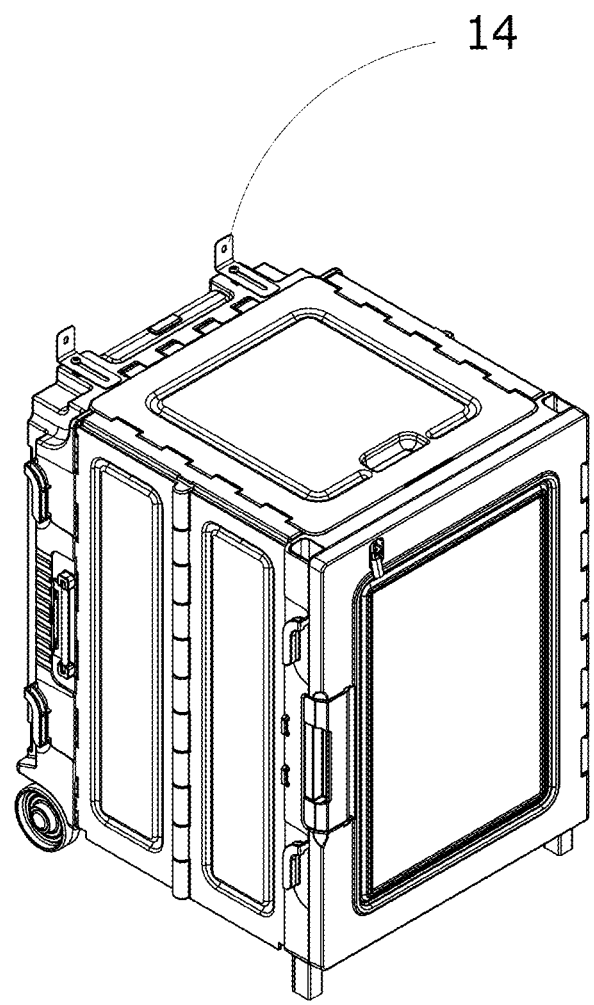
FIG. 1 is a three-dimensional perspective view illustrating a folding storage cabinet according to an example implementation of the present disclosure.

The following disclosure contains specific information pertaining to exemplary implementations in the present disclosure. The drawings in the present disclosure and their accompanying detailed disclosure are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features are identified (although, in some examples, not shown) by numerals in the exemplary figures. However, the features in different implementations may be different in other respects, and thus shall not be narrowly confined to what is shown in the figures.

The disclosure uses the phrases "in one implementation," "in some implementations," and so on, which may each refer to one or more of the same or different implementations. The term "coupled" is defined as connected, directly or indirectly through intervening components and is not necessarily limited to physical connections. The term "comprising" means "including, but not necessarily limited to;" it specifically indicates open-ended inclusion or membership in the so-described combination, group, series and the equivalent.

Additionally, for the purposes of explanation and non-limitation, specific details, such as functional entities, techniques, protocols, standard, and the like, are set forth for providing an understanding of the described technology. In other examples, detailed disclosure of well-known methods, technologies, systems, architectures, and the like are omitted so as not to obscure the disclosure with unnecessary details.

The terms "first", "second", "third" and the like in the specification and the above-mentioned drawings of the present disclosure are used to distinguish between different objects rather than to describe a specific order. Additionally, the term "comprising" and its variations are intended to encompass non-exclusive inclusion. For example, processes, methods, systems, products, or devices that encompass a series of steps or modules are not limited to the steps or modules listed, but may optionally include steps or modules not listed, or optionally include other inherent steps or modules for those processes, methods, products, or devices.

The present disclosure will be described in further detail with reference to the attached drawings.

FIG. 1 is a three-dimensional perspective view illustrating a folding storage cabinet according to an example implementation of the present disclosure. The folding storage cabinet 10 forms a square-shaped container when assembled. The folding storage cabinet 10 is designed to accommodate items within the box body. In one implementation, the folding storage cabinet 10 is equipped with at least one wall bracket 14, which may be used to secure the folding storage cabinet 10 to a wall or other lockable location.

Returning to FIG. 2, an exploded view illustrating components of a folding storage cabinet according to an example implementation of the present disclosure is provided. The folding storage cabinet 10 includes a back plate 101, which is formed with at least one bottom pivot part 1011 at the bottom portion and at least one top pivot part 1012 at the top portion. At least one back plate pivot part 1013 is arranged on both sides between the top portion and the bottom portion respectively. Two folding side plates 102 are foldable in a flat manner. One side of the folding side plate 102 is formed with at least one first side plate pivot part 1021, while the other side is formed with at least one second side plate pivot part 1022. The first side plate pivot part 1021 of the folding side plates 102 correspondingly pivotally connected to the back plate pivot part 1013 of the back plate 101. In one implementation, the folding side plate 102 are composed of a first side plate 1025 and a second side plate 1026. At least one first side plate pivot part 1021 is formed on one side of the first side plate 1025, while the other side of the first side plate 1025 is formed with at least one third side plate pivot part 1027. At least one second side plate pivot part 1022 is formed on one side of the second side plate 1026, and the second side plate 1026 is formed with at least one fourth side plate pivot part 1028 on the corresponding side of the third side plate pivot part 1027. The third side plate pivot part 1027 correspondingly pivotally connected to the fourth side plate pivot part 1028, allowing the first side plate 1025 and the second side plate 1026 are foldable in a flat manner. The folding storage cabinet 10 also includes a frame 103, the selected part of the dotted circle is a schematic diagram of another angle of the frame 103. At least one fixed groove 1031 on the top surface of the frame 103 and at least one fixed rod 1032 on the bottom surface of the frame 103. At least one first frame pivot part 1033 is formed on each side of the frame 103 facing the two folding side plates 102. The first frame pivot part 1033 movably pivots to the second side plate pivot part 1022 of the folding side plates 102. A bottom plate 104, which has at least one bottom plate pivot part 1041 on one side of the bottom plate 104. The bottom plate 104 may be movably pivoted to the bottom pivot part 1011 of the back plate 101 through the bottom plate pivot part 1041, so that the bottom plate 104 may be folded relative to the back plate 101. Additionally, a top plate 105 includes a cover plate 1051 with at least one first cover plate pivot part 1052 on one side of the top plate 105 and the other two opposite sides of the top plate 105 are each formed with at least one second cover plate pivot part 1053. The first cover plate pivot part 1052 pivotally connected to the top pivot part 1012 of the back plate 101, allowing the cover plate 1051 to be opened and folded relative to the back plate 101. Two wing plates 1054 are each formed with at least one wing plate pivot part 1055 corresponding to one side of the two second cover plate pivot parts 1053 of the cover plate 1051, the wing plate pivot part 1055 is correspondingly pivoted to the second cover plate pivot part 1053, such that the wing plates 1054 to be opened and closed relative to the cover plate. In one implementation, the folding storage cabinet 10 further includes a door plate 106, which has at least one door plate pivot part 1061 on one side of the door plate 106. The frame 103 is formed with at least one second frame pivot part 1034 on the side facing the door plate pivot part 1061, the door plate pivot part 1061 is correspondingly pivoted to the second frame pivot part 1034, allowing the door plate 106 to be opened and closed relative to the frame 103. The assembled configuration of the above components is shown in FIG. 1. Furthermore, in one implementation, the bottom pivot part 1011 and the top pivot part 1012 may be formed on the frame 103 without being formed on the back plate 101, or the bottom pivot part 1011 may be formed on the back plate 101 while the top pivot part 1012 is formed on the frame 103, or the bottom pivot part 1011 may be formed on the frame 103 while the top pivot part 1012 is formed on the back plate 101.

The bottom pivot part 1011 may be formed at the bottom portion of one of the frame 103 and the back plate 101, while the top pivot part 1012 may be formed at the top portion of other one of the frame 103 and the back plate 101. In one implementation, when the one of the frame 103 and the back plate 101 is the same as the other one of the frame 103 and the back plate 101, the top pivot part 1012 and the bottom pivot part 1011 are both located in the same one of the frame 103 and the back plate 101, meaning that the top pivot part 1012 and the bottom pivot part 1011 are simultaneously formed on the back plate 101 or the frame 103. In another implementation, when the one of the frame 103 and the back plate 101 is different from the other one of the frame 103 and the back plate 101, the top pivot part 1012 is located in one of the frame 103 and the back plate 101, while the bottom pivot part 1011 is located in other one of the frame 103 and the back plate 101. In other words, the bottom pivot part 1011 may be formed on the back plate 101 while the top pivot part 1012 is formed on the frame 103, or the bottom pivot part 1011 is formed on the frame body 103 while the top pivot part 1012 is formed on the back plate 101. The present disclosure is not limited to this. In one implementation, the first cover plate pivot part 1052 of the cover plate 1051 corresponds to the top pivot part 1012. Therefore, when the top pivot part 1012 is set on the frame 103, the first cover plate pivot part 1052 of the cover plate 1051 is oriented towards the top pivot part 1012 of the frame 103. In one implementation, the bottom plate pivot part 1041 of the bottom plate 104 corresponds to the bottom pivot part 1011. Therefore, when the bottom pivot part 1011 is set on the frame 103, the bottom plate pivot part 1041 of the bottom plate 104 is oriented towards the bottom pivot part 1011 of the frame 103.

In one implementation, the frame 103 and the back plate 101 may simultaneously have the bottom pivot part 1011, and the bottom plate pivot part 1041 may be connected to either the frame 103 or the back plate 101 at the bottom pivot part 1011, and the folding direction of the bottom plate 104 is determined by the pivotally connecting object of the bottom plate pivot part 1041. In one implementation, the frame 103 and the back plate 101 may simultaneously have the top pivot part 1012, and the first cover plate pivot part 1052 may be pivotally connected to either the frame 103 or the back plate 101 at the top pivot part 1012, and the folding direction of the cover plate 1051 is determined by the pivotally connecting object of the first cover plate pivot part 1052.

Figure 3:
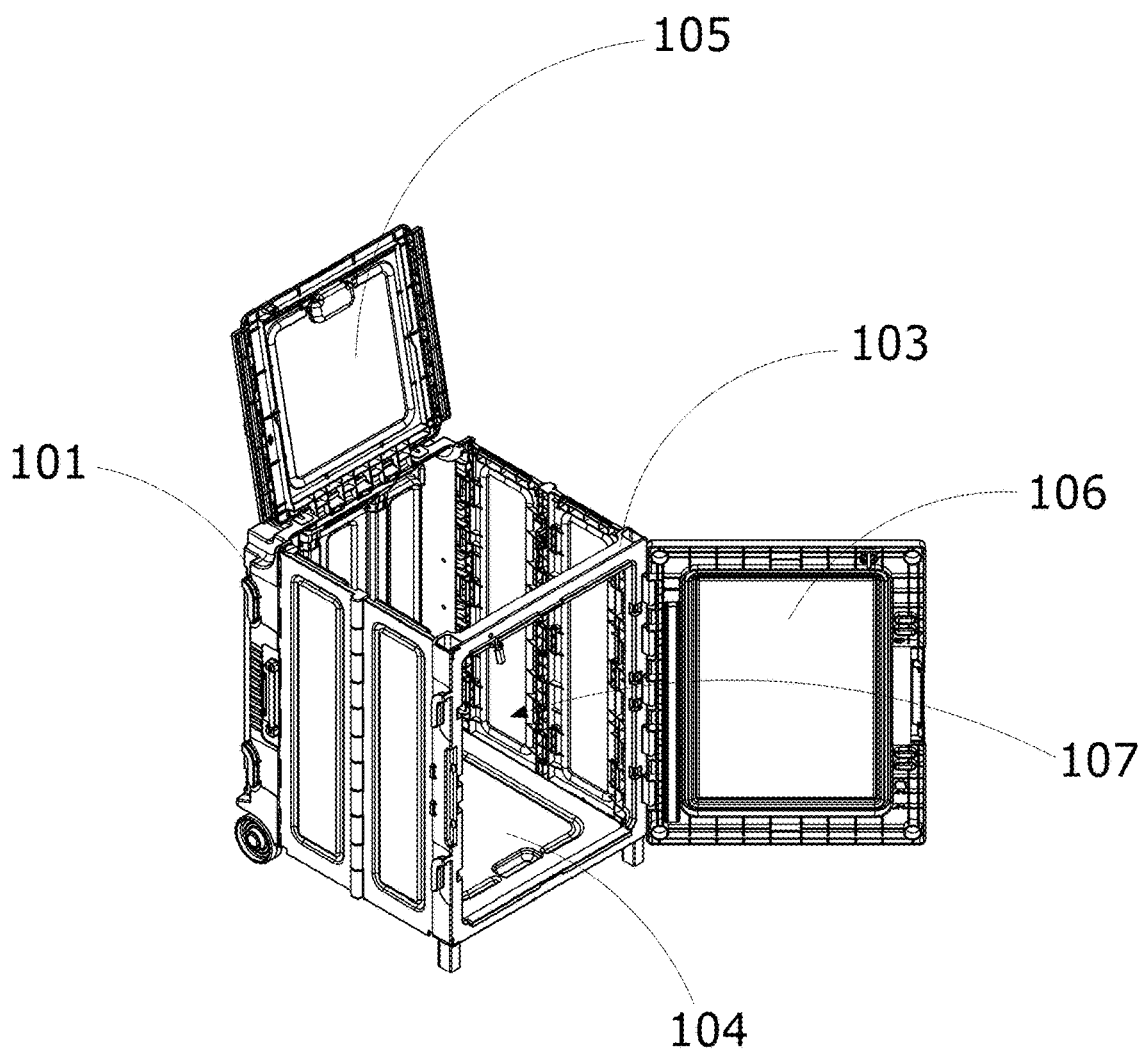
FIG. 3 is a schematic diagram illustrating opening and closing of a top plate and a door plate of a folding storage cabinet according to another example implementation of the present disclosure.

FIG. 3 is a schematic diagram illustrating opening and closing of a top plate and a door plate of a folding storage cabinet according to another example implementation of the present disclosure. The inside of the folding storage cabinet 10 forms a storage space 107. When the top plate 105 is opened relative to the back plate 101, the user may place items into the storage space 107 on the bottom plate 104 from above the folding storage cabinet 10. When the door plate 106 is opened relative to the frame 103, the user may also place items into the storage space 107 on the bottom plate 104 from the front of the folding storage cabinet 10. Meanwhile, it is also possible to simultaneously open the top plate 105 and the door plate 106 to retrieve or place items.

Figure 2:
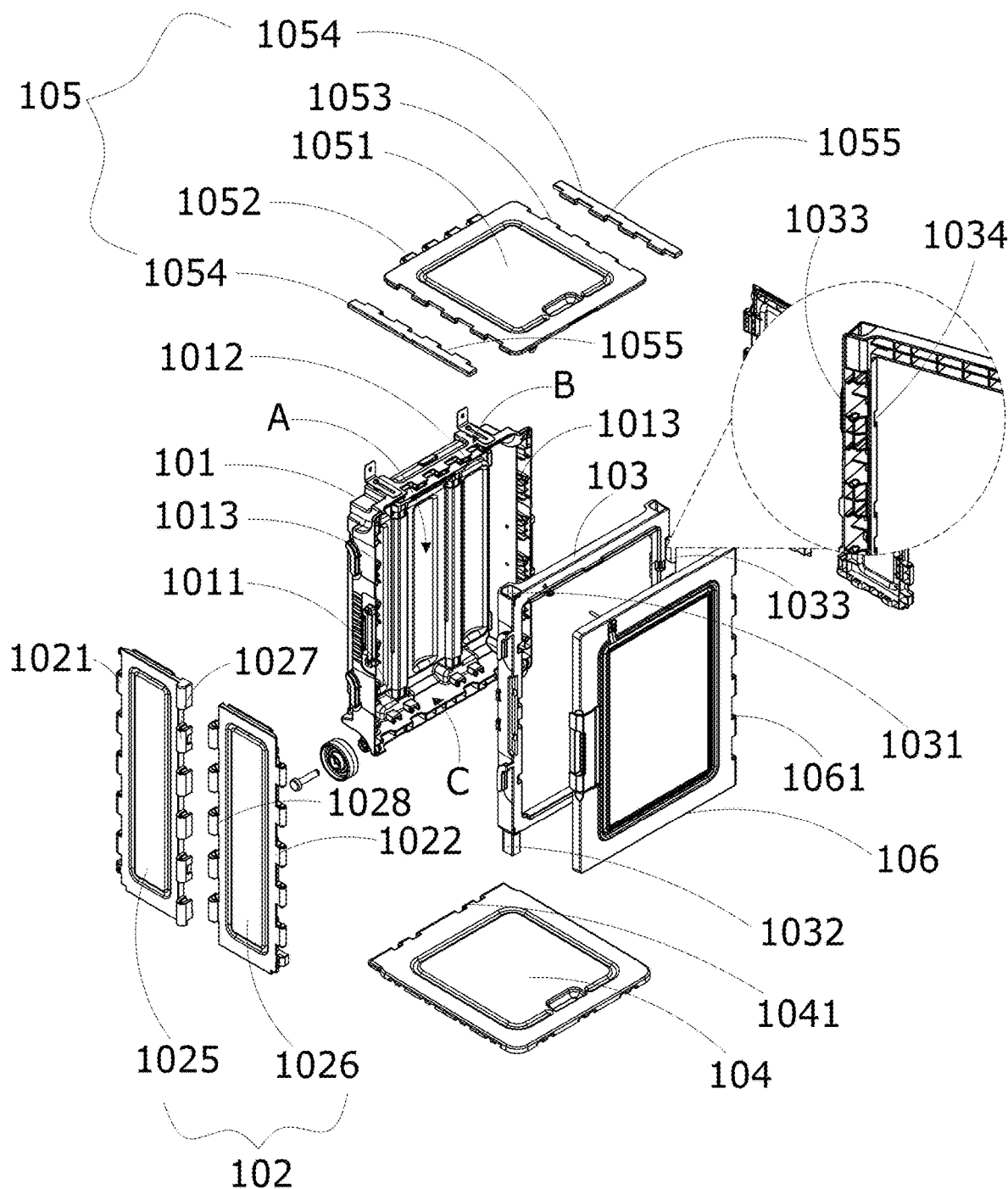
FIG. 2 is an exploded view illustrating components of a folding storage cabinet according to an example implementation of the present disclosure.
Figure 4:
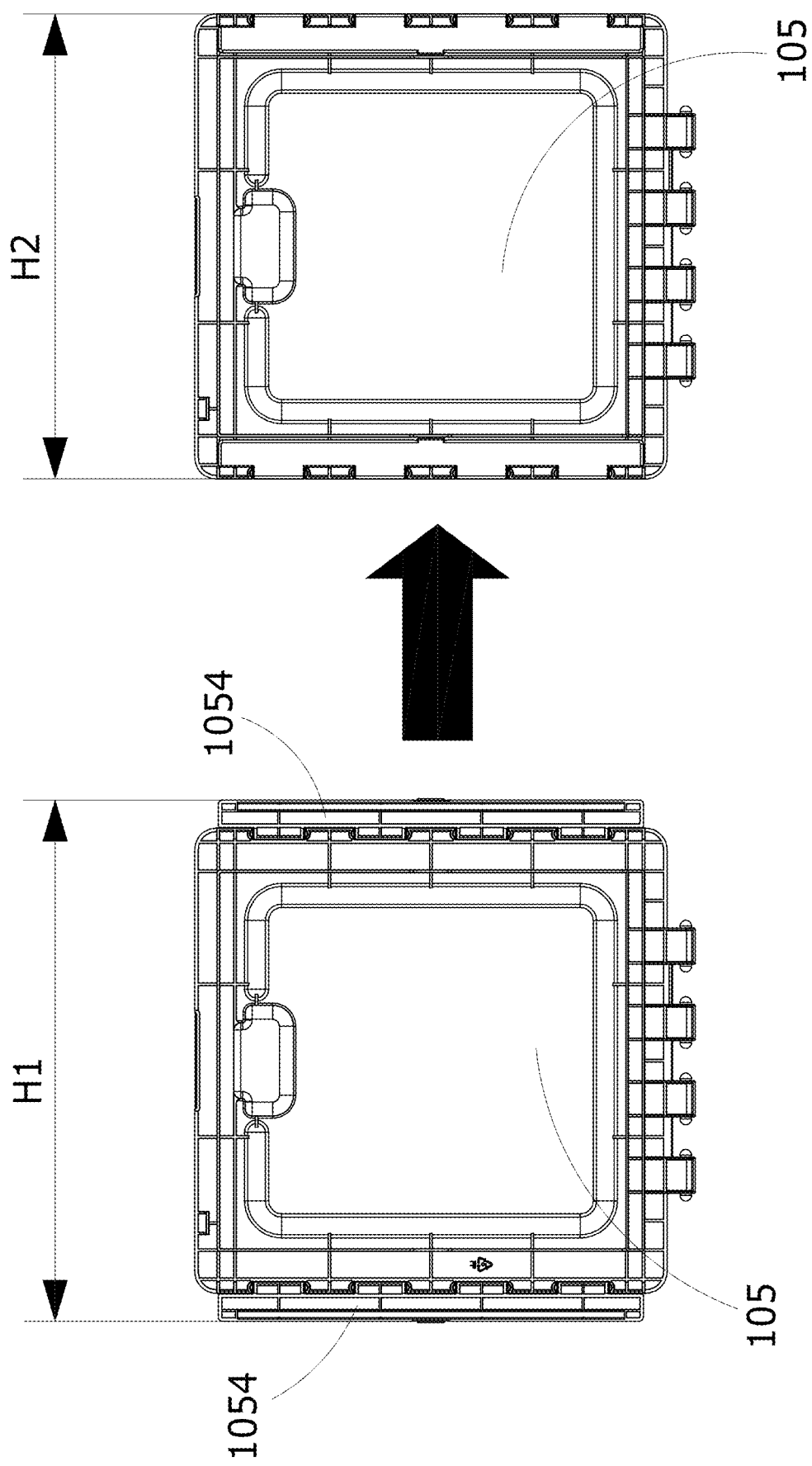
FIG. 4 is a schematic diagram illustrating folding of a top plate and a wing plate according to an example implementation of the present disclosure.
Figure 5:
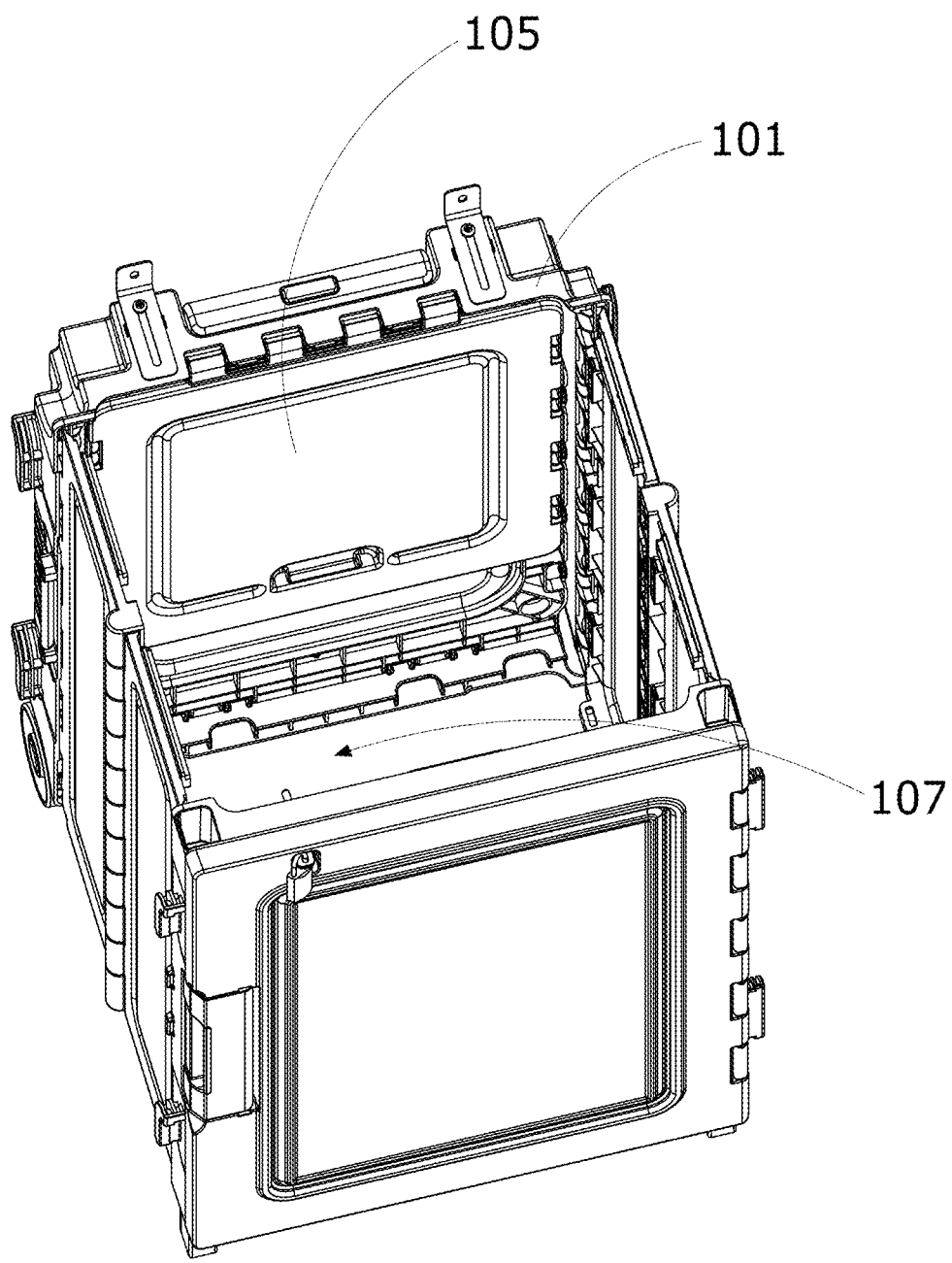
FIG. 5 is a schematic diagram illustrating the folding of the top plate according to another example implementation of the present disclosure.
Figure 6:
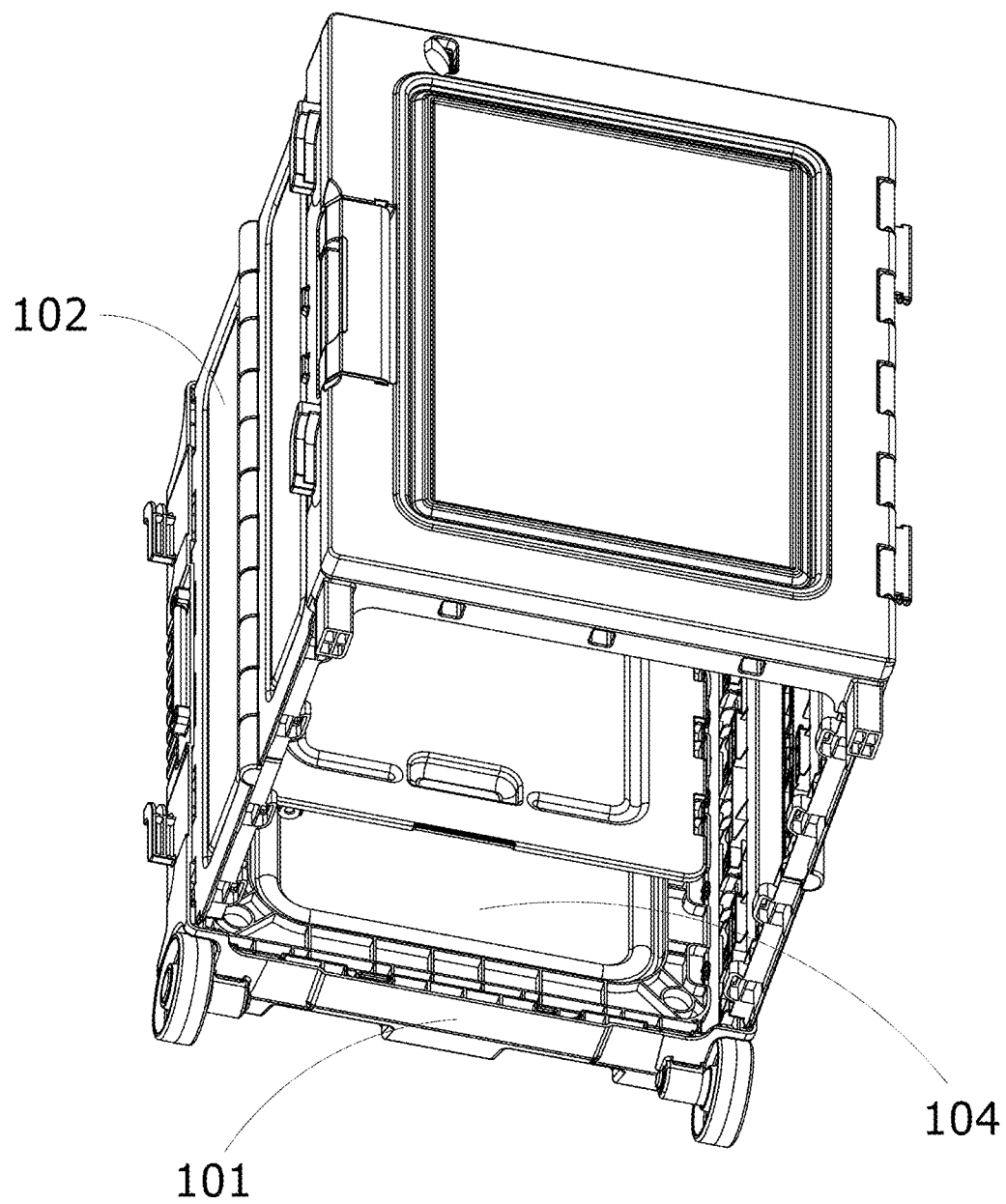
FIG. 6 is a schematic diagram illustrating the folding of a bottom plate according to an example implementation of the present disclosure.

FIG. 4 is a schematic diagram illustrating folding of a top plate and a wing plate according to an example implementation of the present disclosure. With reference to FIG. 2 together. In one implementation, the two sides of the cover plate 1051 of the top plate 105 are respectively pivotally connected to two wing plates 1054. The top plate 105 normally press against the two folding side plates 102 through the two wing plates 1054, resulting the top plate 105 is normally formed with a width H1 before the two wing plates 1054 are folded. The wing plates 1054 may be folded relative to the cover plate 1051, when the two wing plates 1054 are folded towards the cover plate 1051, the top plate 105 forms a width H2. Comparing the width H1 with the width H2, it may be seen that the width H2 is obviously smaller than the width H1. Please refer to FIG. 5, which is a schematic diagram illustrating the folding of the top plate according to another example implementation of the present disclosure. As described in FIG. 4, when the folding storage cabinet 10 is to be folded for storage when not in use, the first step involves bending and folding the two wing plates 1054 of the top plate 105 relative to the cover plate 1051, so that the top plate 105 forms the width H2. After the two wings 1054 of the top plate 105 are folded, the whole top plate 105 may be folded relative to the back plate 101 and further overlapped with the back plate 101, so that the top plate 105 may be folded inside the storage space 107. Furthermore, please refer to FIG. 6, which is a schematic diagram illustrating the folding of a bottom plate according to an example implementation of the present disclosure. As described in FIG. 5, the bottom plate 104 is normally pivotally connected to the back plate 101 and both sides of the bottom plate 104 press against the two folding side plates 102. Therefore, when the bottom plate 104 needs to be folded, the bottom of the bottom plate 104 may be exerted force to push the bottom plate 104 upward, so that the bottom plate 104 is folded relative to the back plate 101 and overlaps with the back plate 101. Additionally, the folding actions of the top plate 105 and the bottom plate 104 is provided as the implementations and is not limited to the specific order shown in the figure. It is not necessary to fold the bottom plate 104 first and then fold the top plate 105 as shown in the figure, so that the top plate 105 covers the bottom plate 104. Returning to FIG. 2, the back plate 101 has a bottom surface A, an upper side surface B and a lower side surface C. The top pivot part 1012 is located on the upper side surface B, and the bottom pivot part 1011 is located on the lower side surface C. If the distance between the top pivot part 1012 and the bottom surface A is greater than the distance between the bottom pivot part 1011 and the bottom surface A, then when the top plate 105 and the bottom plate 104 are folded, it is necessary to fold the bottom plate 104 first, and then fold the top plate 105, so that the top plate 105 and the bottom plate 104 may be sequentially folded into a space formed by the bottom surface A, the upper side surface B and the lower side surface C of the back plate 101. If the distance between the top pivot part 1012 and the bottom surface A is smaller than the distance between the bottom pivot part 1011 and the bottom surface A, then when the top plate 105 and the bottom plate 104 are folded, it is necessary to fold the top plate 105 first, and then fold the bottom plate 104. In order to sequentially fold the top plate 105 and the bottom plate 104 into a space formed by the bottom surface A, the upper side surface B and the lower side surface C of the back plate 101. In order to fully fold the top plate 105 and the bottom plate 104 into the space of the back plate 101 without affecting the folding of the folding side plates 102, the distance between the top pivot part 1012 and the bottom surface A is not equal to the distance between the bottom pivot part 1011 and the bottom surface A, and the difference between the two distances must be at least greater than a difference threshold. The threshold value may be the thickness of the last folded component of both the top plate 105 and the bottom plate 104. For example, if the bottom plate 104 is folded first and then the top plate 105 is folded, the threshold value may be the thickness of the top plate 105 in the closed state of the wing plate 1054. If the top plate 105 is closed before the bottom plate 104 is closed, the difference threshold may be the thickness of the bottom plate 104. In one implementation, when the top pivot part 1012 and the bottom pivot part 1011 are formed on the frame 103, the frame 103 may also have a bottom surface, an upper side surface, and a lower side surface. The distance between the top pivot part 1012 and the bottom surface of the frame 103, and the distance between the bottom pivot part 1011 and the bottom surface of the frame 103 are not the same, to avoid the top plate 105 and the bottom plate 104 interfering with the folding of the folding side plates 102. In another implementation, if the height of the back plate 101 is greater than the sum of the lengths of the bottom plate 104 and the top plate 105, that is, there is no overlap between the top plate 105 and the bottom plate 104 after folding, the distance between the top pivot part 1012 and the bottom surface A may be equal to the distance between the bottom pivot part 1011 and the bottom surface A.

Figure 7:
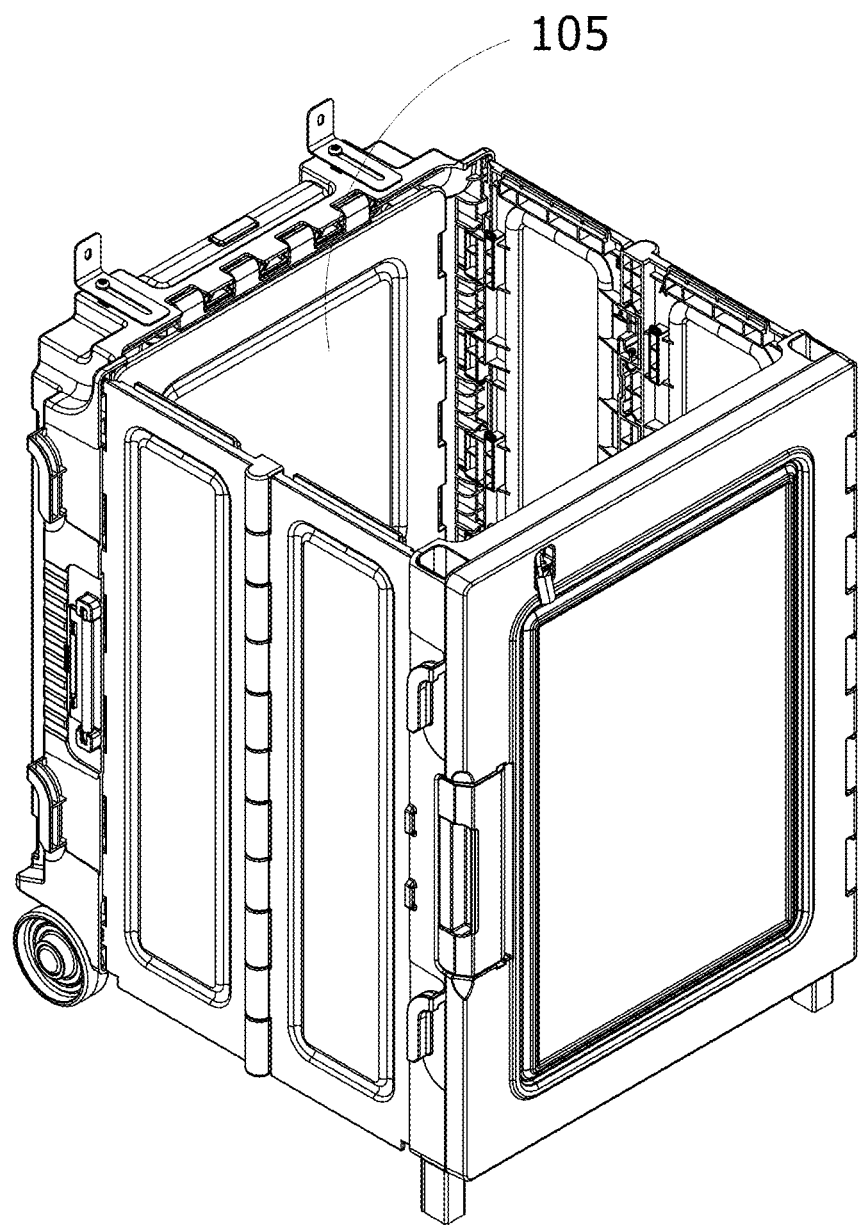
FIG. 7 is a schematic diagram illustrating folding of the folding storage cabinet according to an example implementation of the present disclosure.
Figure 8:
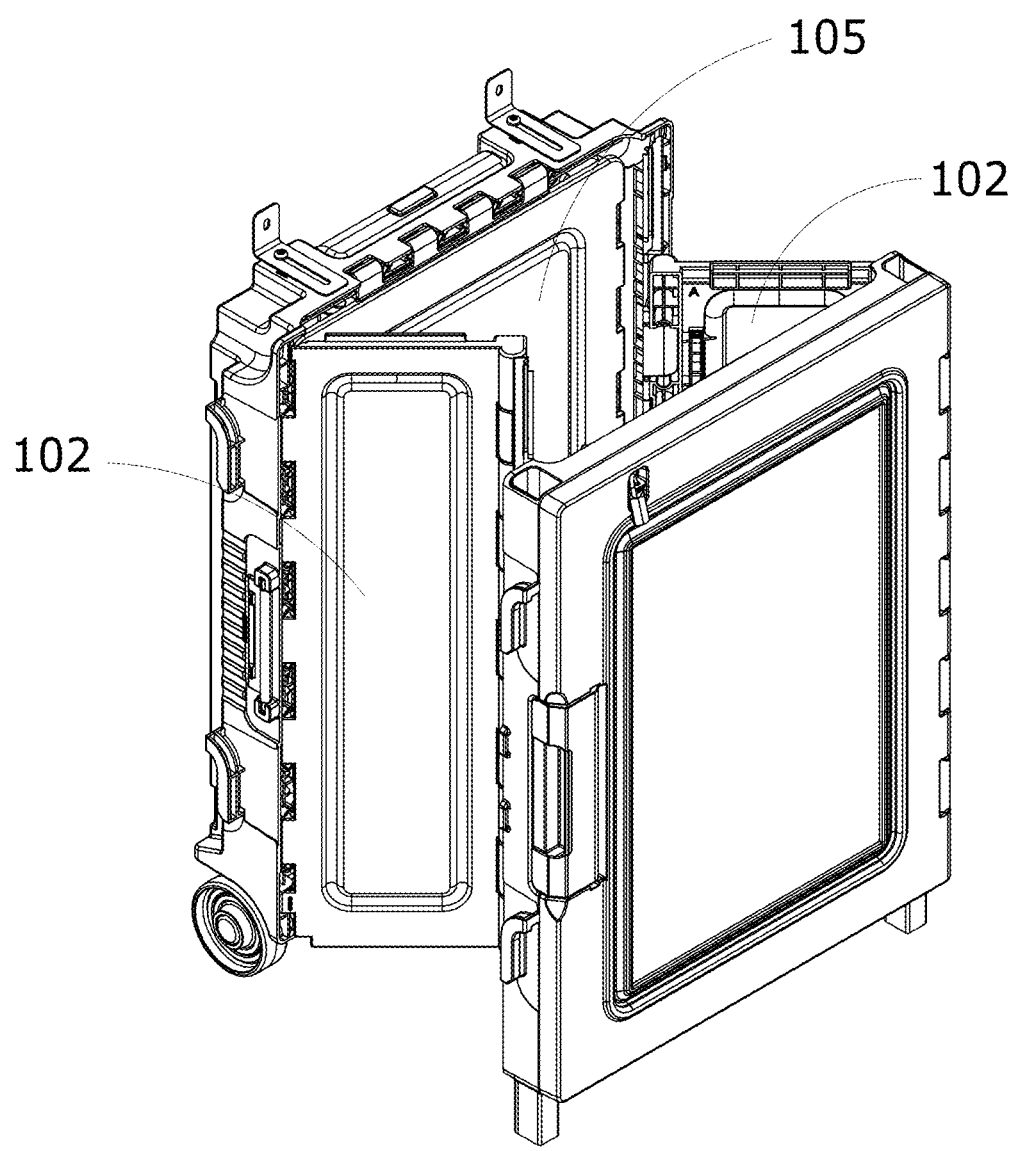
FIG. 8 is another schematic diagram illustrating the folding of the folding storage cabinet in FIG. 7 according to the example implementation of the present disclosure.
Figure 9:
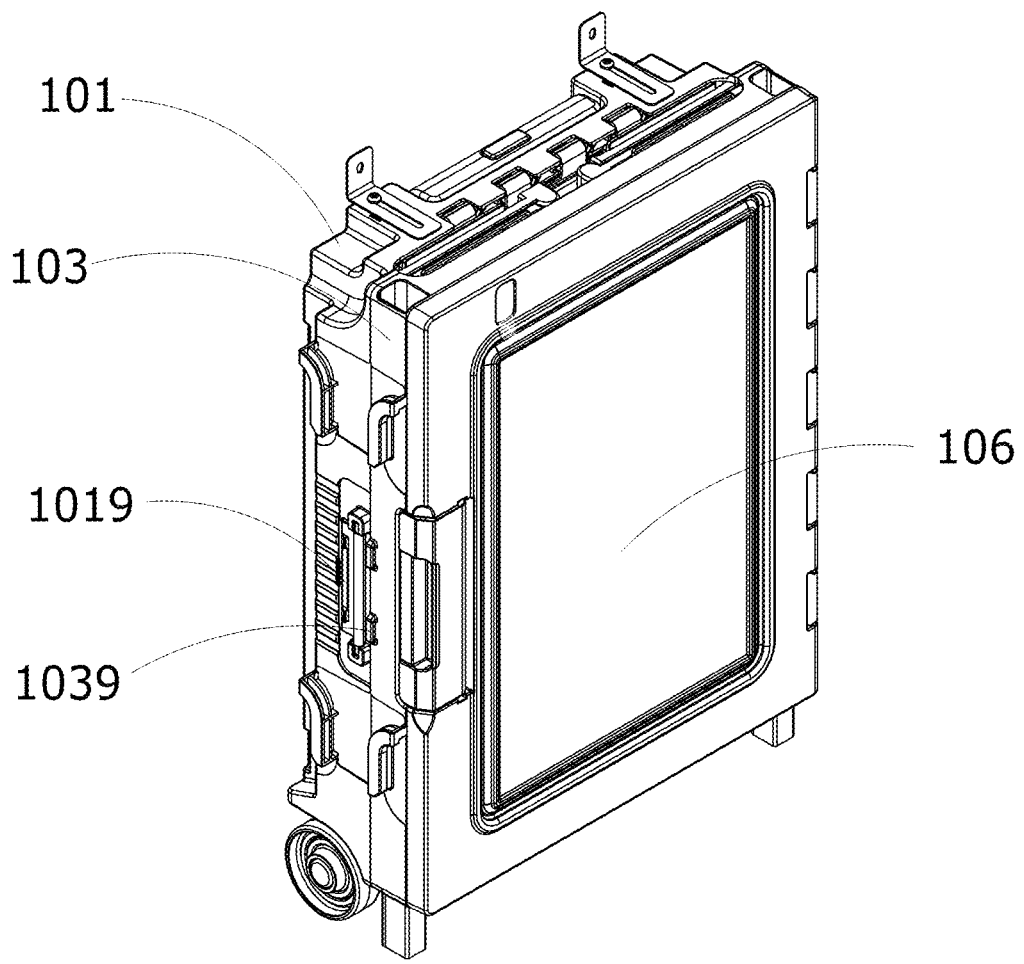
FIG. 9 is another schematic diagram illustrating the folding of the folding storage cabinet in FIG. 7 according to the example implementation of the present disclosure.

FIG. 7 and FIG. 8 are the schematic diagrams illustrating the folding of the folding storage cabinet according to the example implementations of the present disclosure. With reference to FIG. 7, after the top plate 105 and the bottom plate 104 (not shown) are folded, the top and bottom of the folding storage cabinet 10 are connected. Referring to FIG. 8, the top plate 105 and the bottom plate 104 (not shown) of the folding storage cabinet 10 have been folded, and then the two folding side plates 102 are folded into a V-shape. Please refer to FIG. 9, which shows another schematic diagram illustrating the folding of the folding storage cabinet in FIG. 7 according to the example implementation of the present disclosure. When the two folding side plates 102 are completely folded, the two folding side plates 102 may be folded into a flat manner, so that the overall volume of the folding storage cabinet 10 is greatly reduced, which is convenient for storage when not in use. In one implementation, one side of the back plate 101 is provided with a fastening piece 1019, and the side of the frame 103 adjacent to the fastening piece 1019 is relatively formed with a relative fastening part 1039. When the two folding side plates 102 are bent into a flat manner, the fastening piece 1019 may be fastened with the relative fastening part 1039 to stably hold the folding storage cabinet 10.

Figure 10:
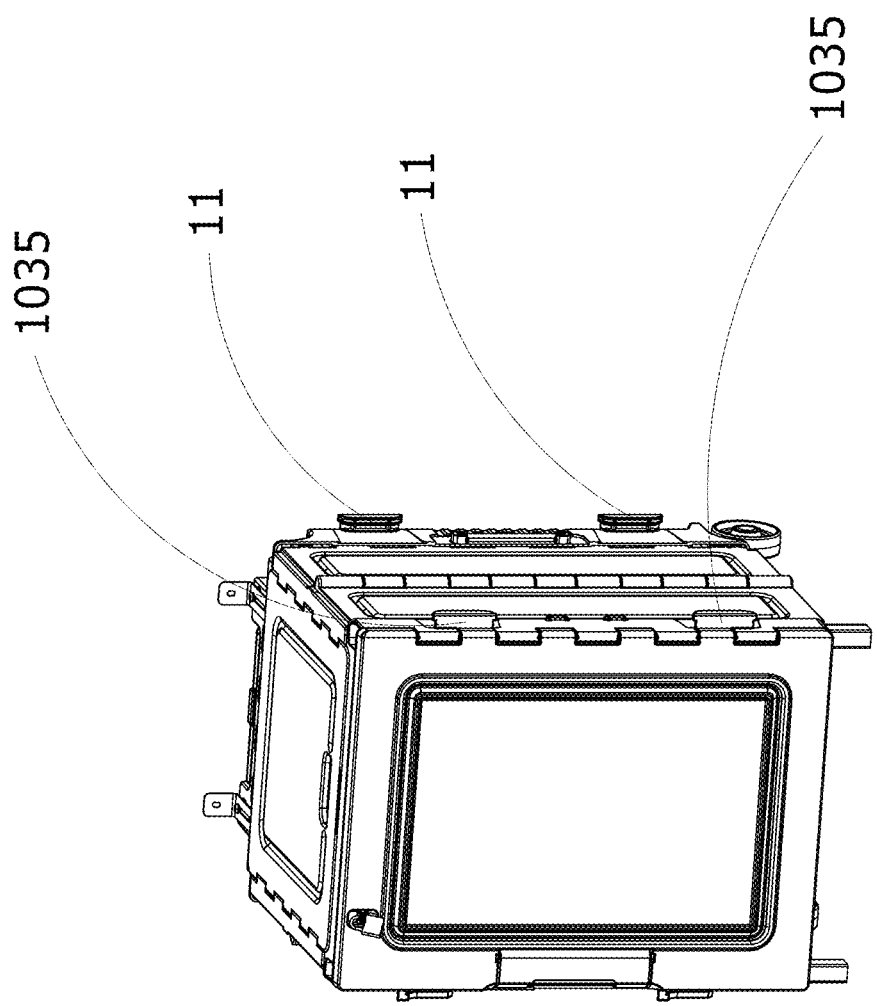
FIG. 10 illustrates a perspective view of a folding storage cabinet according to an example implementation of the present disclosure.
Figure 11:
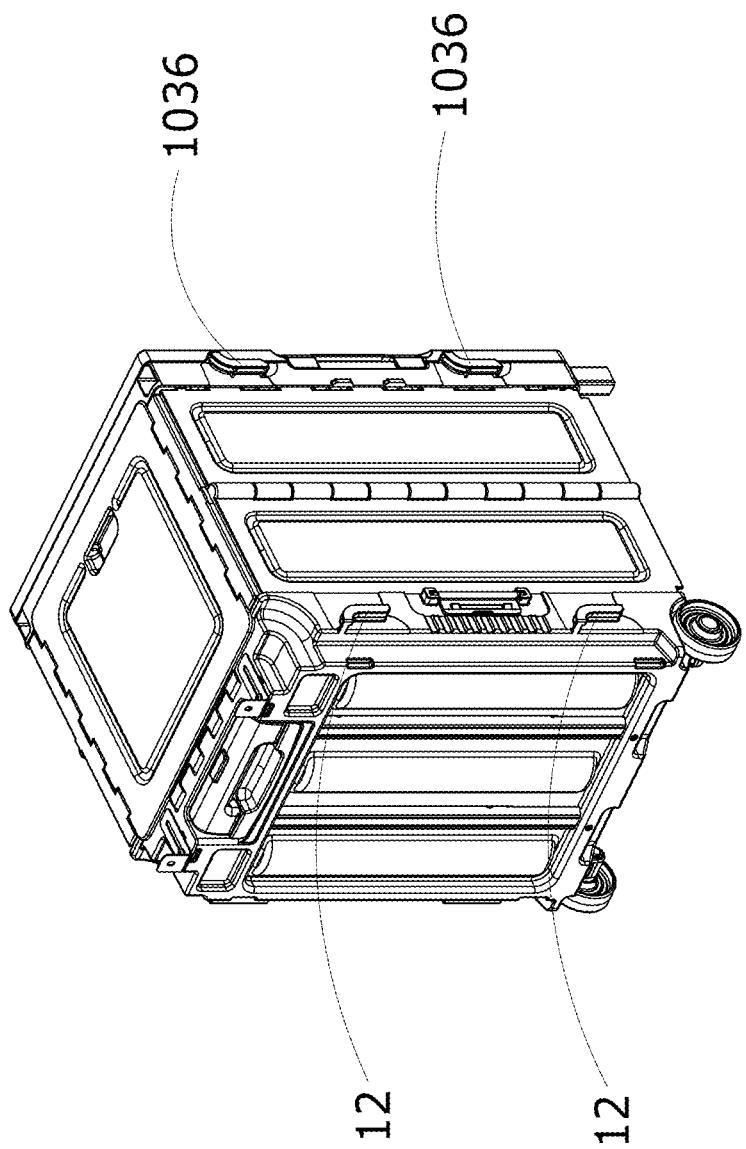
FIG. 11 illustrates another perspective view of the folding storage cabinet in FIG. 10 from a different angle according to an example implementation of the present disclosure.
Figure 12:
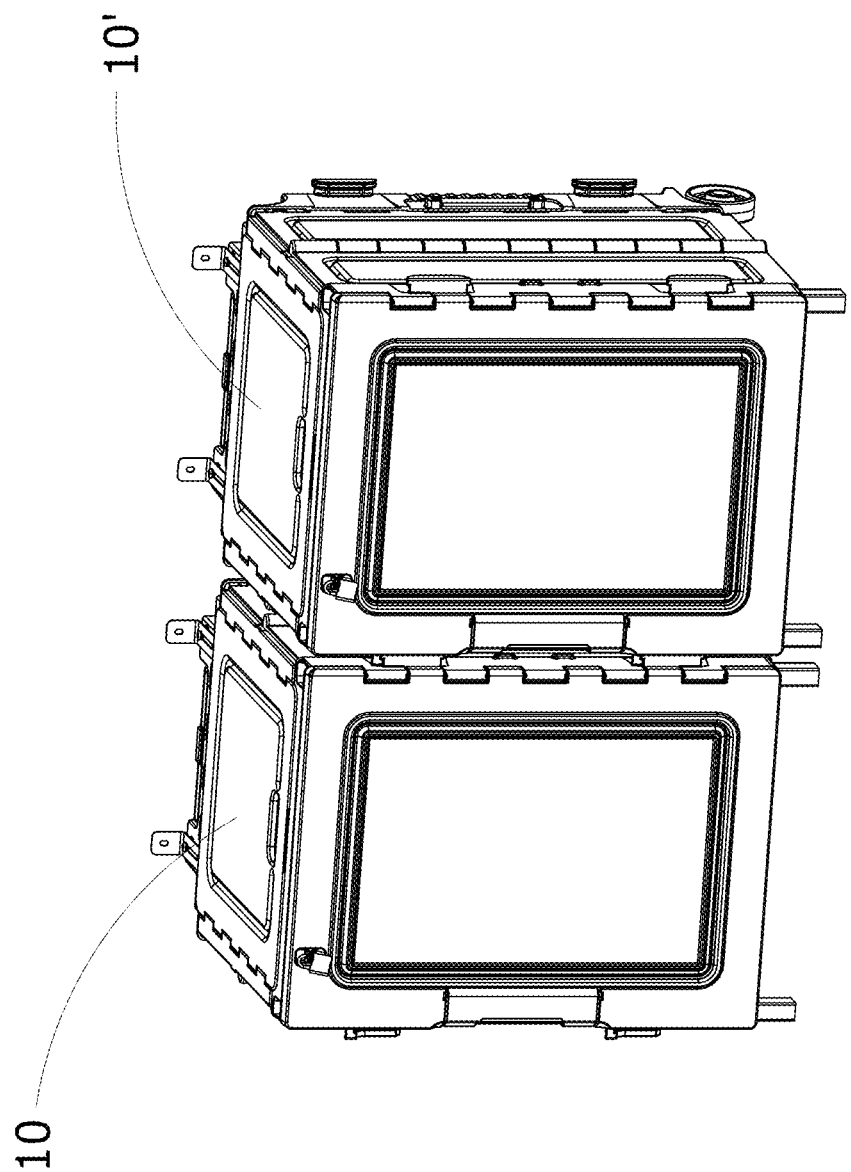
FIG. 12 is a schematic diagram illustrating multiple folding storage cabinets arranged side by side according to an example implementation of the present disclosure.

FIG. 10 illustrates a perspective view of a folding storage cabinet according to an example implementation of the present disclosure. At least one first fixing piece 11 and one second fixing piece 1035 are formed on a side of the folding storage cabinet. The at least one first fixing piece 11 is on the back plate 101, the at least one second fixing piece 1035 is on the frame 103. Please refer to FIG. 11, which illustrates another perspective view of the folding storage cabinet in FIG. 10 from a different angle according to an example implementation of the present disclosure. At least one third fixing piece 12 and one fourth fixing piece 1036 are formed on another side of the folding storage cabinet. The at least one third fixing piece 12 is on the back plate 101, the at least one fourth fixing piece 1036 is on the frame 103. Please refer to FIG. 12, which is a schematic diagram illustrating multiple folding storage cabinets arranged side by side. As described in FIG. 10 and FIG. 11, the first fixing piece 11 and the second fixing piece 1035 of the folding storage cabinet are configured to assemble with a third fixing piece 12 and a fourth fixing piece 1036 of another folding storage cabinet, so that a plurality of folding storage cabinets (10, 10') is stably arranged side by side.

Figure 13:
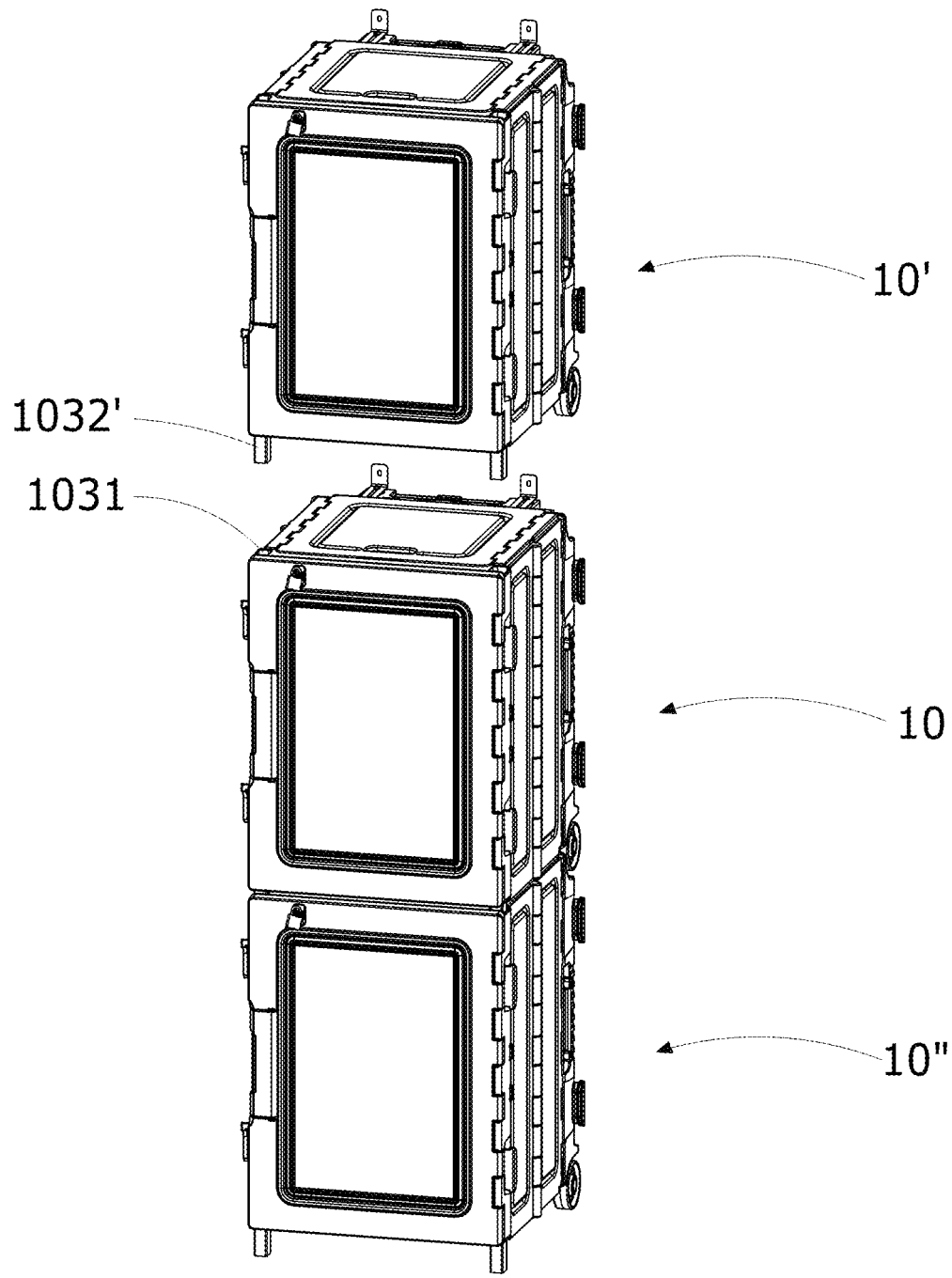
FIG. 13 is a schematic diagram illustrating multiple folding storage cabinets according to an example implementation of the present disclosure.
Figure 14:
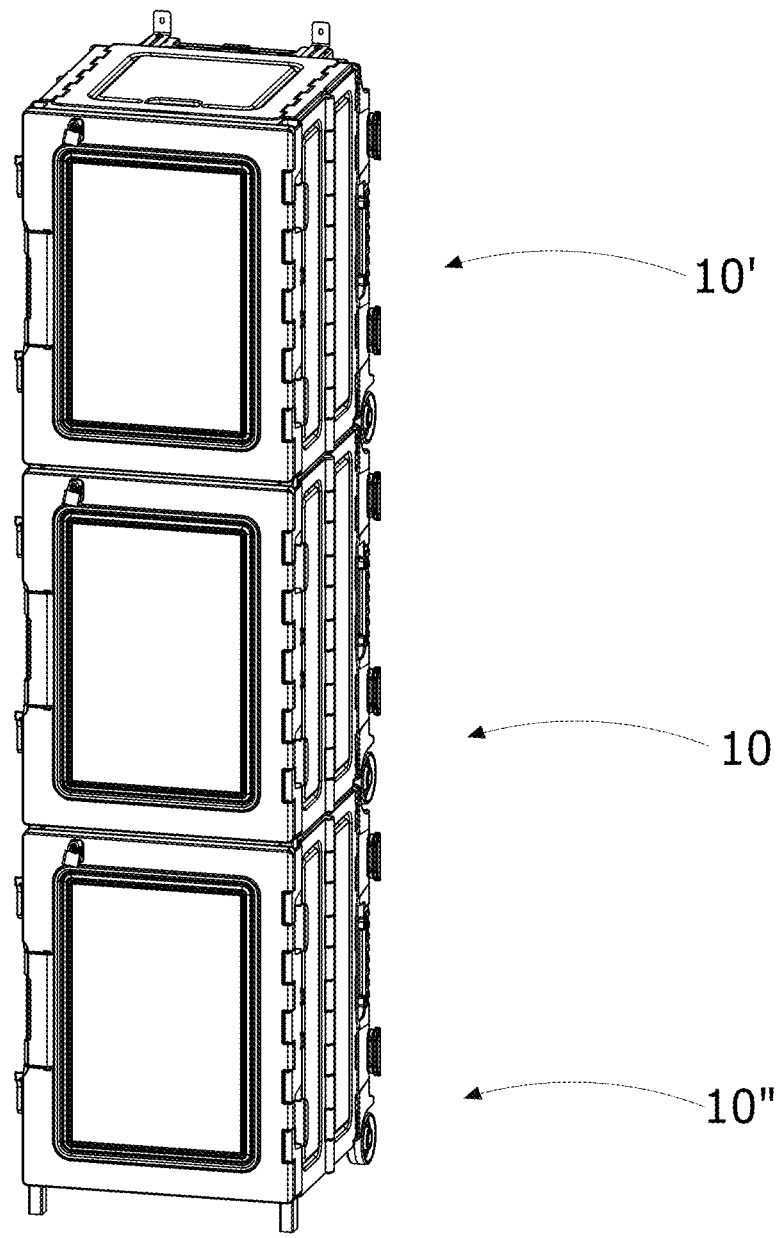
FIG. 14 is a schematic diagram illustrating the multiple folding storage cabinets in FIG. 13 stacked.
Figure 15:
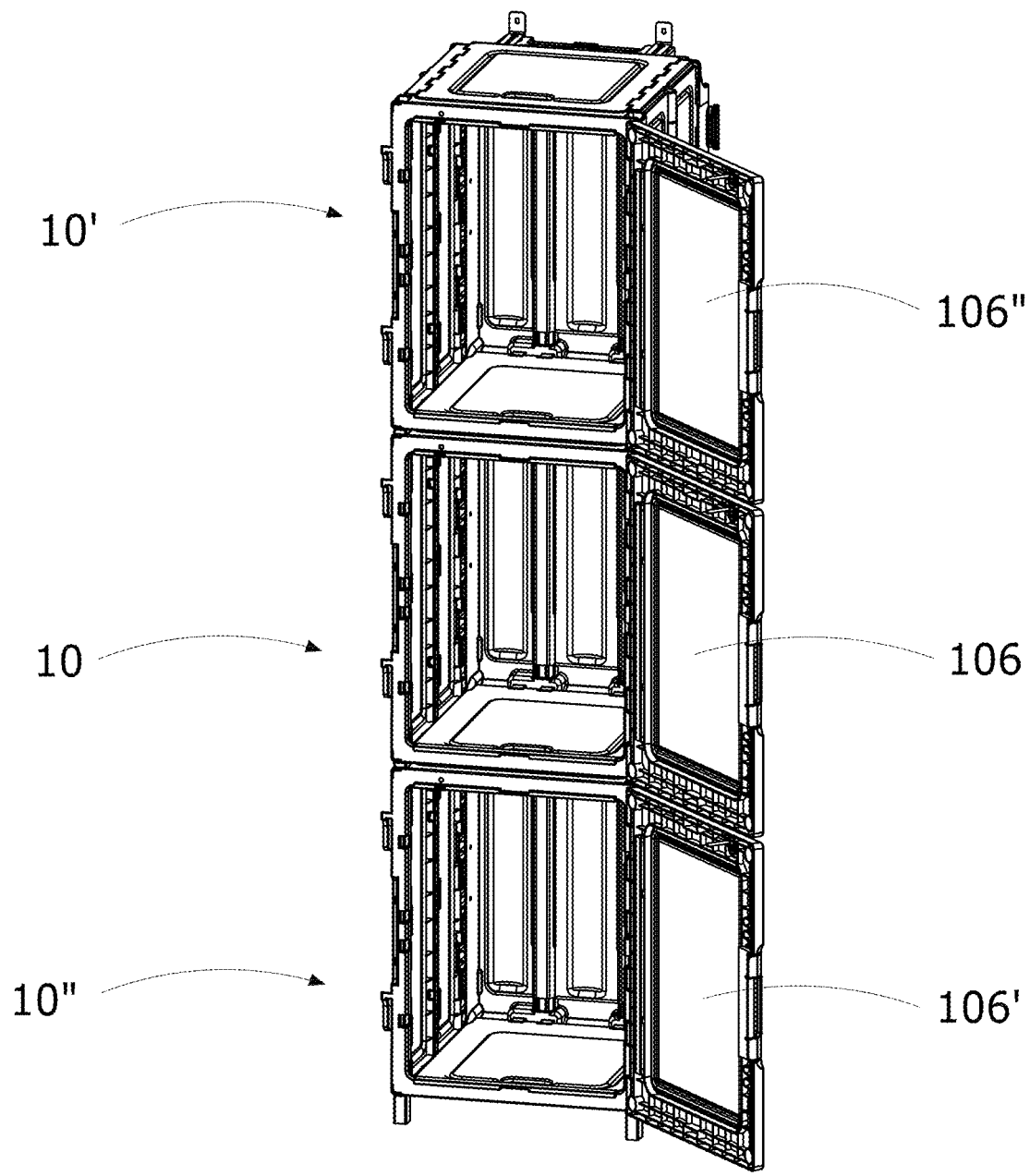
FIG. 15 is a schematic diagram illustrating a usable state after stacking the multiple folding storage cabinets in FIG. 14.
Figure 16:
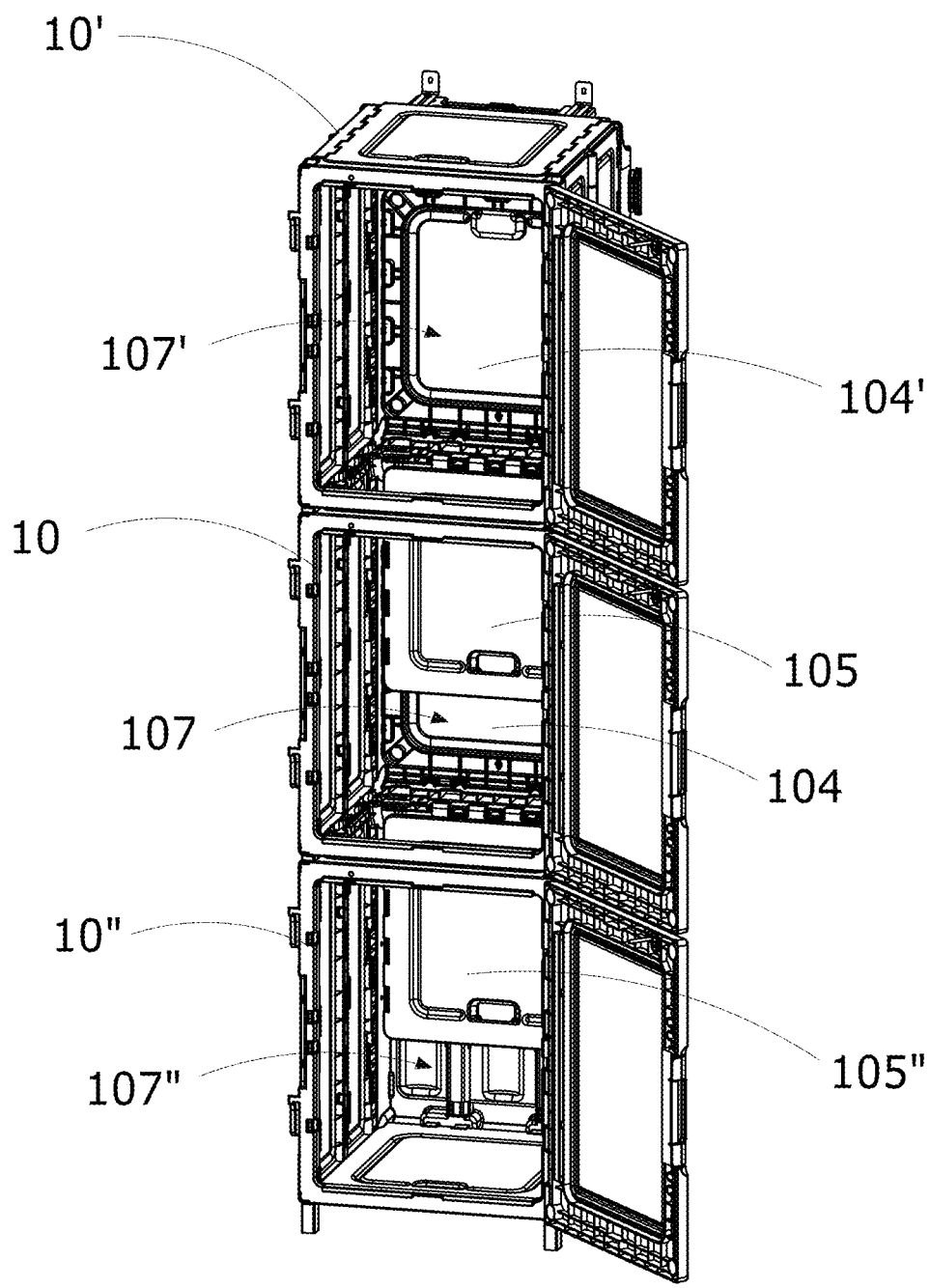
FIG. 16 is a schematic diagram illustrating another usable state after stacking multiple folding storage cabinets in FIG. 15.

FIG. 13 is a schematic diagram illustrating multiple folding storage cabinets according to an example implementation of the present disclosure. Please refer to FIG. 2. The folding storage cabinet 10 may be used by stacking a plurality of storage cabinets according to the needs of users, to further increase the capacity of the storage space. For the folding storage cabinet 10, the fixed groove 1031 formed by the frame 103 may be inserted by the fixed rod 1032' of another folding storage cabinet 10', so that the folding storage cabinet 10' stands firmly above the folding storage cabinet 10 in a stacked vertical configuration, and the fixed rod 1032 (refer to FIG. 2) of the folding storage cabinet 10 may be inserted into the fixed groove (not shown in figures) of another folding storage cabinet 10". This allows the folding storage cabinet 10 to stand upright above the folding storage cabinet 10" in a stacked vertical configuration. The state of a plurality of folding storage cabinets (10, 10', 10") after being stacked upright is as shown in FIG. 14, which is a schematic diagram illustrating the multiple folding storage cabinets in FIG. 13 stacked. As shown in FIG. 14, a plurality of folding storage cabinets (10, 10', 10") are stacked vertically, and the number of storage cabinets may be stacked according to the user's requirements. FIG. 14 is only an example for illustration, not for limiting storage. Please refer to FIG. 15, which is a schematic diagram illustrating a usable state after stacking the multiple folding storage cabinets in FIG. 14, such as several folding storage cabinets (10, 10', 10") in this figure. After stacking, the door plates (106, 106', 106") may be opened relative to the folding storage cabinets (10, 10', 10"). Furthermore, please refer to FIG. 16, which is a schematic diagram illustrating another usable state after stacking multiple folding storage cabinets in FIG. 15. Following the above, after several folding storage cabinets (10, 10', 10") are stacked, users may further fold the bottom plate 104 and the top plate 105 of the folding storage cabinet 10, and fold the bottom plate 104' of the folding storage cabinet 10', and then fold the top plate 105" of the folding cabinet 10". The storage spaces (107, 107', 107") of a plurality of folding storage cabinets (10, 10', 10") are connected, so that users may place larger items.

Figure 17:
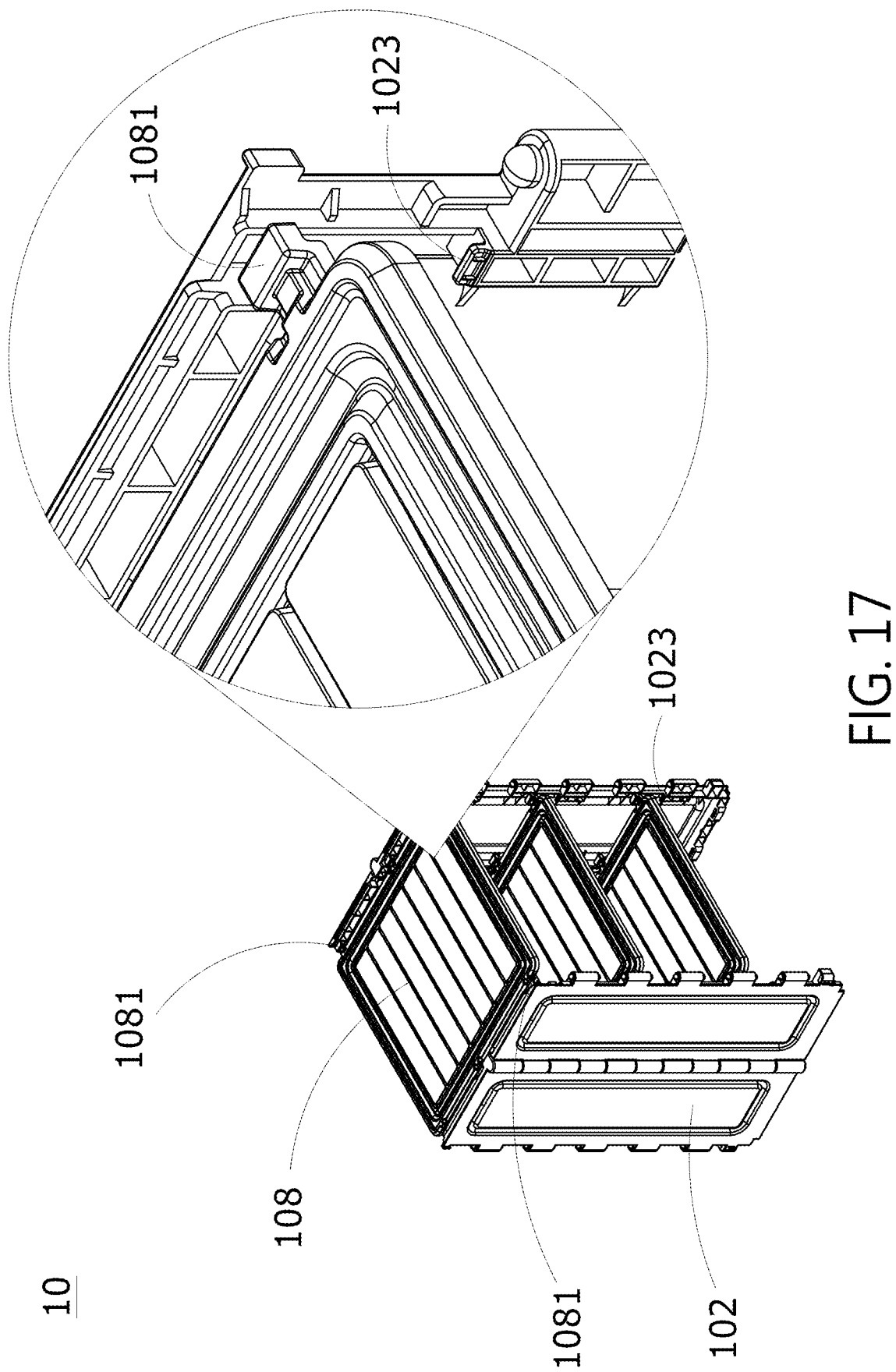
FIG. 17 is a schematic diagram illustrating a folding storage cabinet according to an example implementation of the present disclosure.
Figure 18:
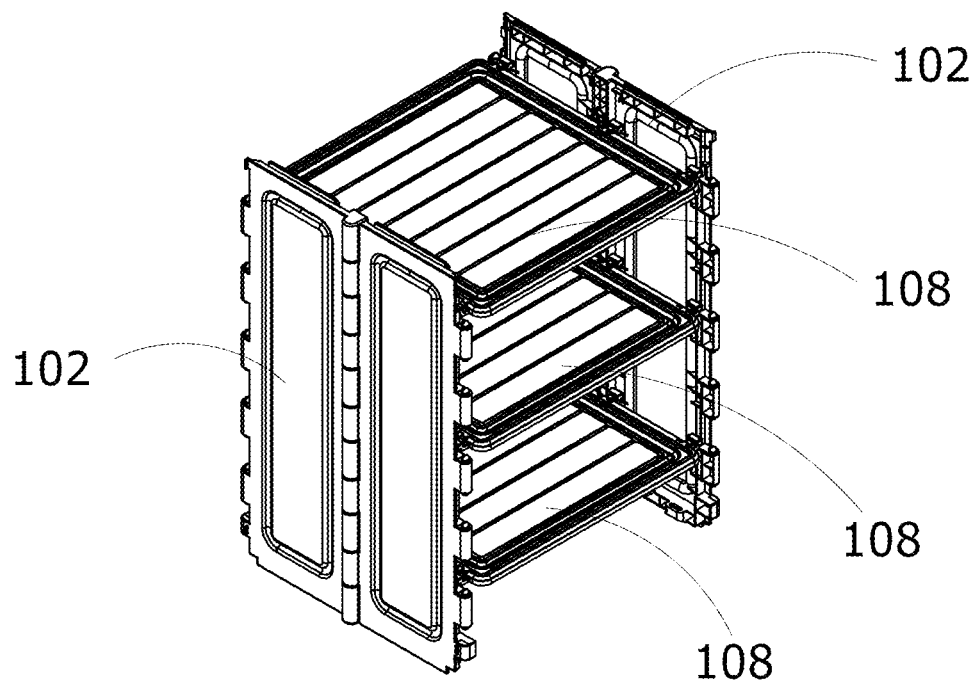
FIG. 18 is a schematic diagram illustrating a laminate disposed between two folding side plates according to an example implementation of the present disclosure.

FIG. 17 is a schematic diagram illustrating a folding storage cabinet according to an example implementation of the present disclosure. In one implementation, the folding storage cabinet 10 further includes at least one laminate 108, where each of two sides of the at least one laminate 108 is formed with a plurality of top supporting parts 1081, each of the two folding side plates 102 is formed with a plurality of corresponding top supporting parts 1023 corresponding to the plurality of top supporting parts 1081, and the at least one laminate 108 is configured to pressed against the plurality of corresponding top supporting parts 1023 through the plurality of top supporting parts 1081 at the two sides, such that the at least one laminate 108 is horizontally positioned between the two folding side plates 102. As shown in FIG. 18, the laminate 108 is placed between the two folding side plates 102, which is a schematic diagram illustrating the laminate disposed between two folding side plates. As described in FIG. 17, the corresponding top supporting parts 1023 of the two folding side plates 102 shown in FIG. 18 may be used for mounting a plurality of laminates 108, so that users may put items on the plurality of laminates 108. Moreover, the distance between the upper and lower parts of the corresponding top supporting parts 1023 of the two folding side plates 102 may be designed according to the user requirements. This embodiment is only for illustration, not for limiting the distance between the upper and lower parts of the corresponding top supporting parts 1023.

Figure 19:
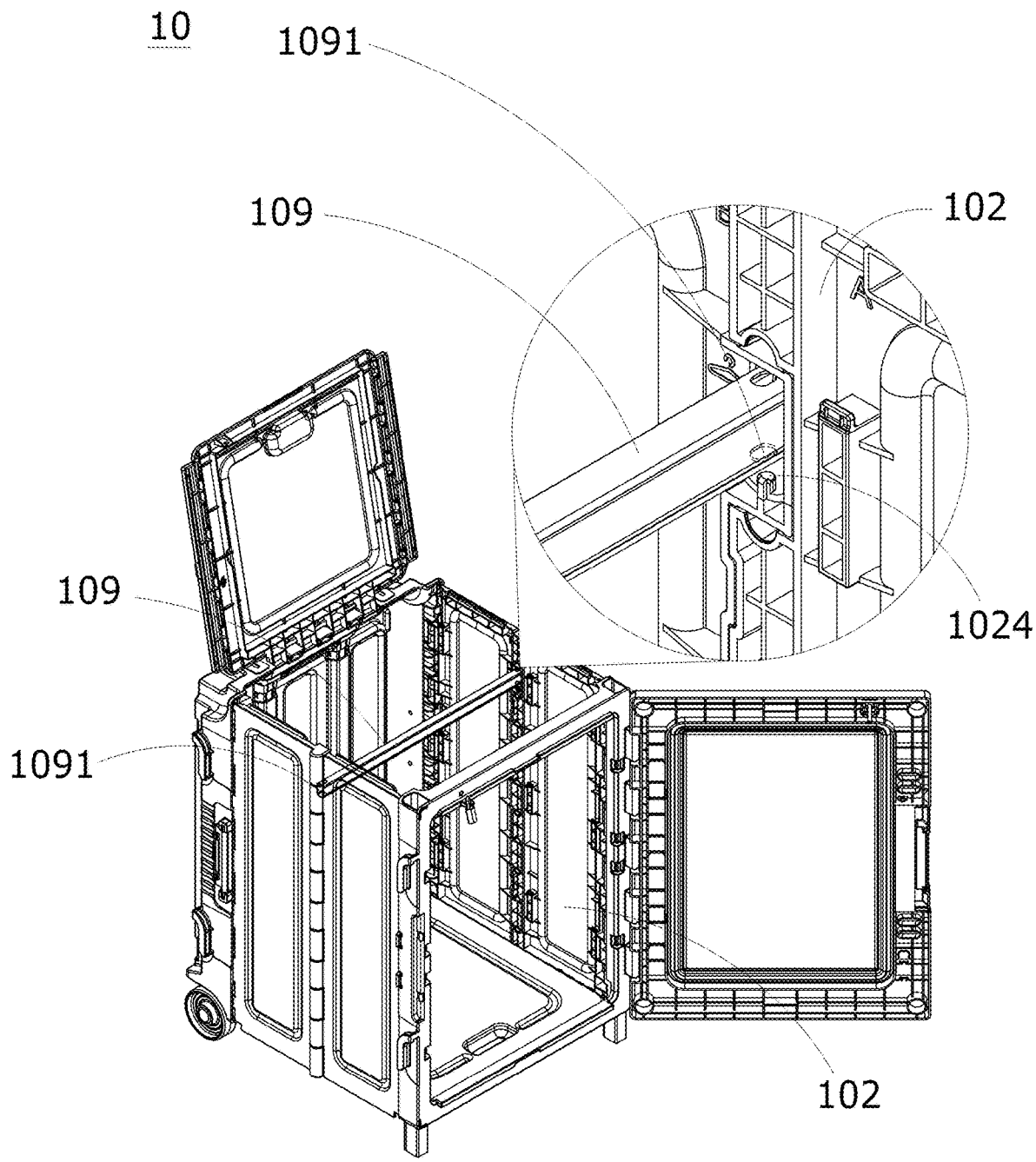
FIG. 19 is a schematic diagram illustrating a folding storage cabinet according to an example implementation of the present disclosure.
Figure 20:
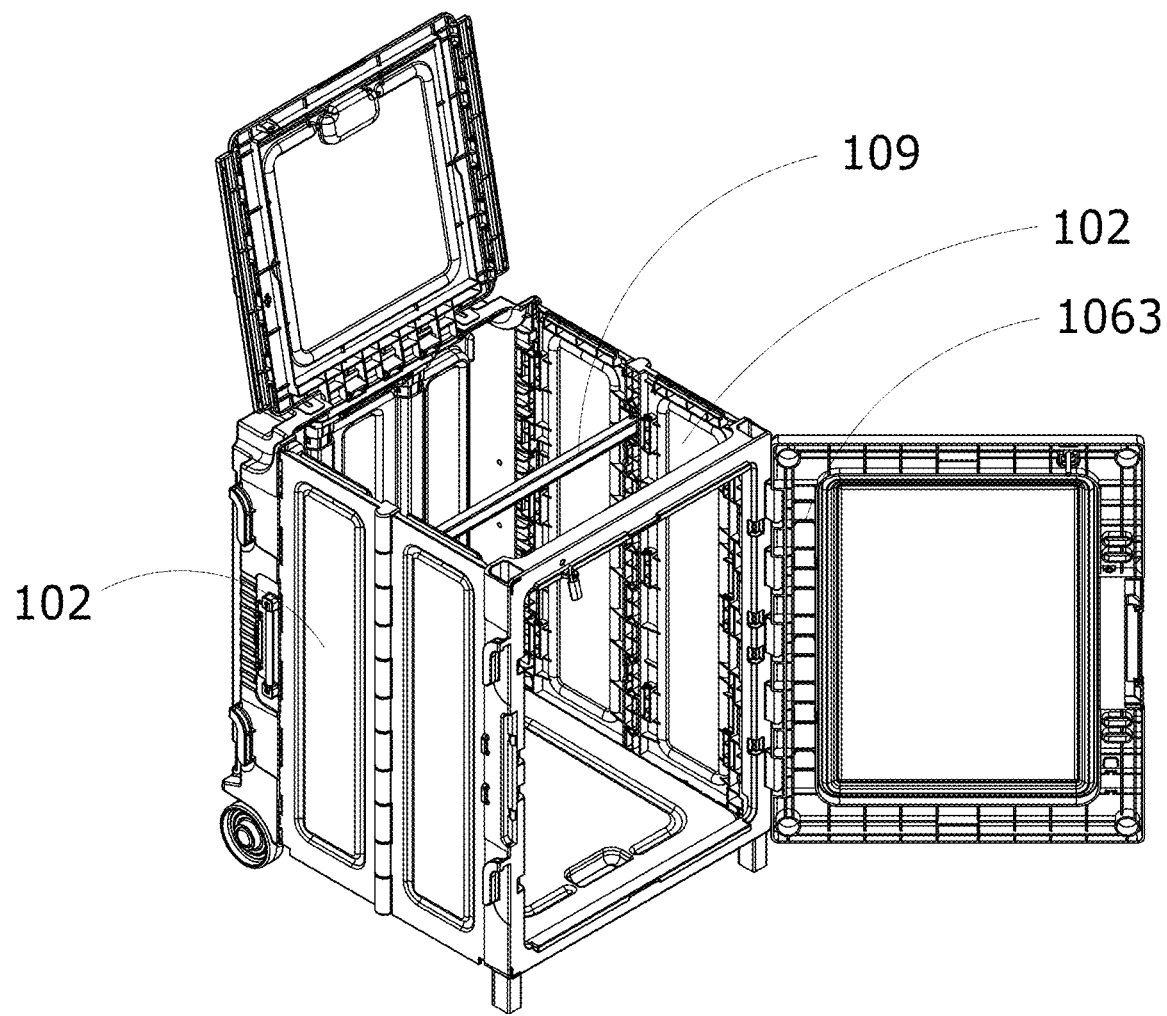
FIG. 20 is a schematic diagram illustrating a hanging rod between two folding side plates according to an example implementation of the present disclosure.

FIG. 19 is a schematic diagram illustrating a folding storage cabinet according to an example implementation of the present disclosure. In one implementation, the folding storage cabinet 10 further includes a hanging rod 109, two ends of the hanging rod are each formed with a fixing hole 1091, and two folding side plates 102 are each formed with a fixed part 1024 corresponding to one of the two ends of the hanging rod 109, and the fixed part 1024 may be a convex column. The hanging rod 109 is configured to be fixed to the fixed part 1024 through the fixing hole 1091 at both ends of the hanging rod 109, such that the hanging rod 109 is horizontally placed between the two folded side plates 102. As shown in FIG. 20, the hanging rod 109 is arranged between two folding side plates 102. As shown in FIG. 20, the hanging rod 109 horizontally arranged between the two folding side plates 102 may be used by a user to hang clothes. In order to facilitate the storage of the hanging rod 109 when not in use, the door plate 106 may further have a slot 1063 formed on the side facing the frame 103, where the slot 1063 may is used for clamping the hanging rod 109, so that the hanging rod 109 may be stored to avoid loss when not in use.

Figure 21:
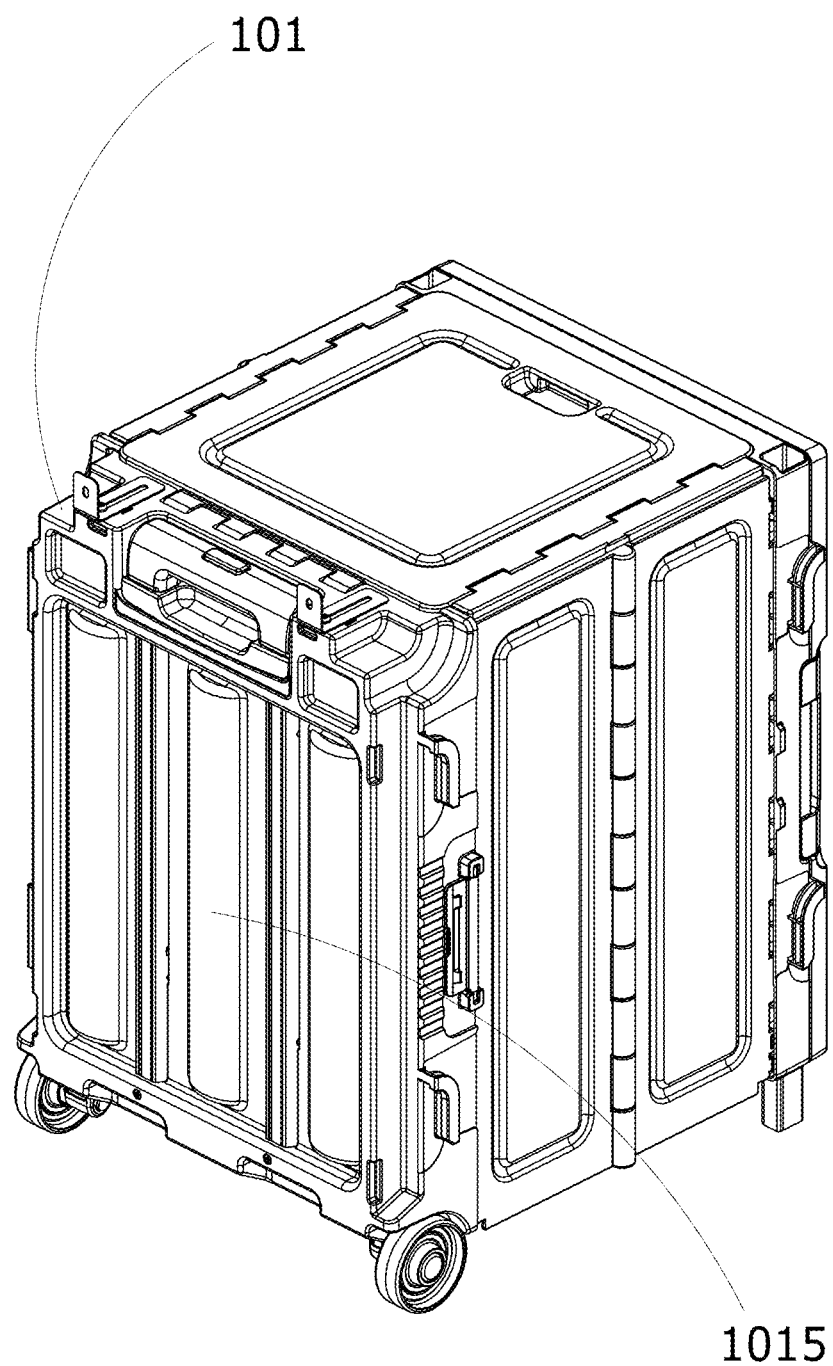
FIG. 21 is a schematic diagram illustrating a folding storage cabinet according to an example implementation of the present disclosure.

FIG. 21 is a schematic diagram illustrating a folding storage cabinet according to an example implementation of the present disclosure. In one implementation, a plurality of reinforcing ribs 1015 are formed on the surface of the back plate 101, which may strengthen the strength of the back plate 101.

Figure 22:
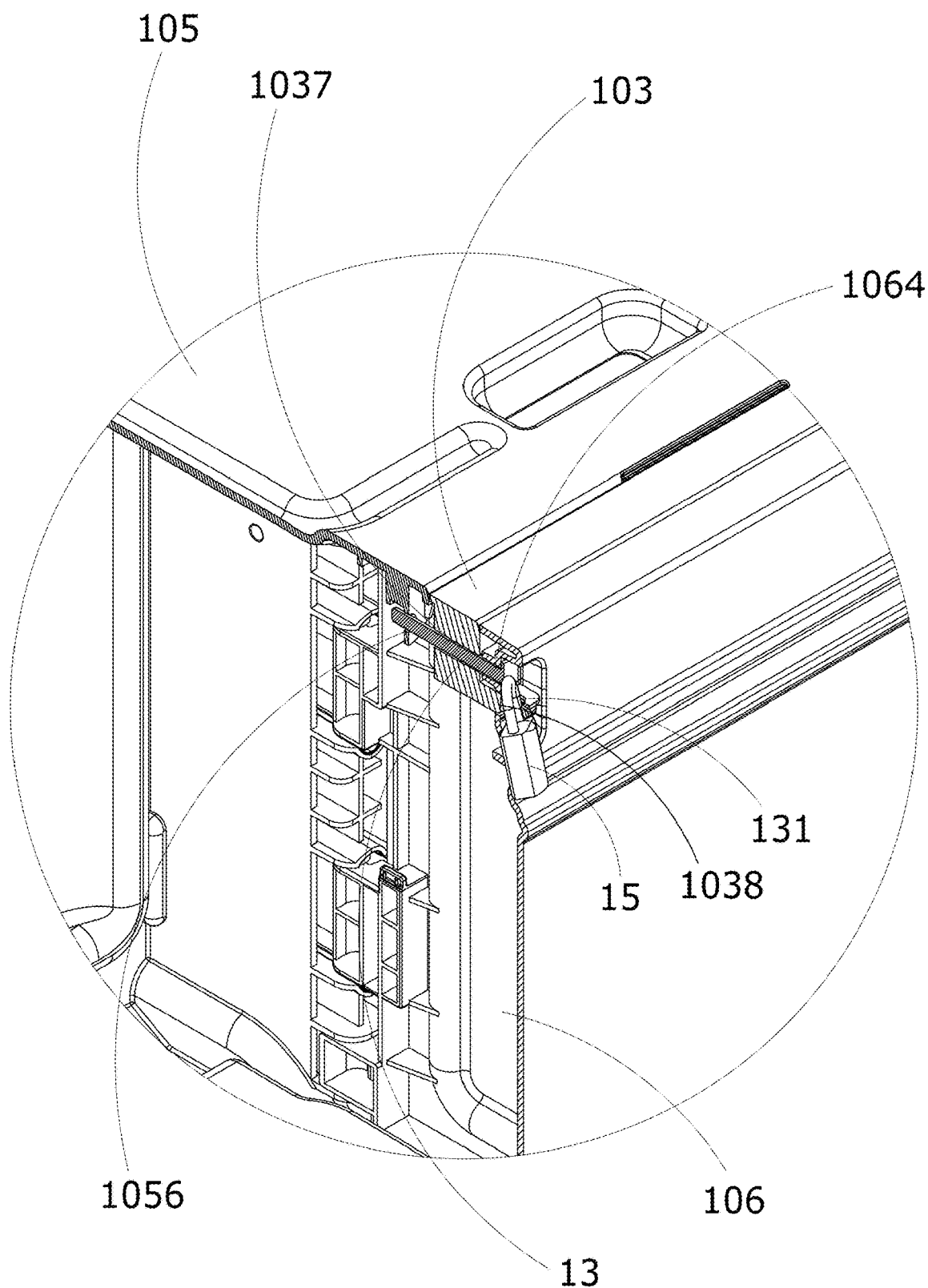
FIG. 22 is a schematic diagram illustrating a folding storage cabinet according to an example implementation of the present disclosure.

FIG. 22 is a schematic diagram illustrating a folding storage cabinet according to an example implementation of the present disclosure. In one implementation, the door plate 106 is formed with a latch hole 1064, and the frame 103 is formed with a first through hole 1037 corresponding to the latch hole 1064. The top plate 105 is formed with a second through hole 1056 corresponding to the first through hole 1037. The door plate 106 further includes a latch 13, with one end of the latch 13 formed with a lock hole 131. The latch 13 may be inserted through the latch hole 1064, the first through hole 1037, and the second through hole 1056, thereby restricting the lifting of the top plate 105 by the latch 13. The frame 103 is formed with a corresponding lock hole 1038 at a position corresponding to the lock hole 131 of the latch 13. The lock hole 131 of the latch 13 may be secured together with the corresponding lock hole 1038 by a lock 15 to prevent the latch 13 from being pulled out.

Figure 23:
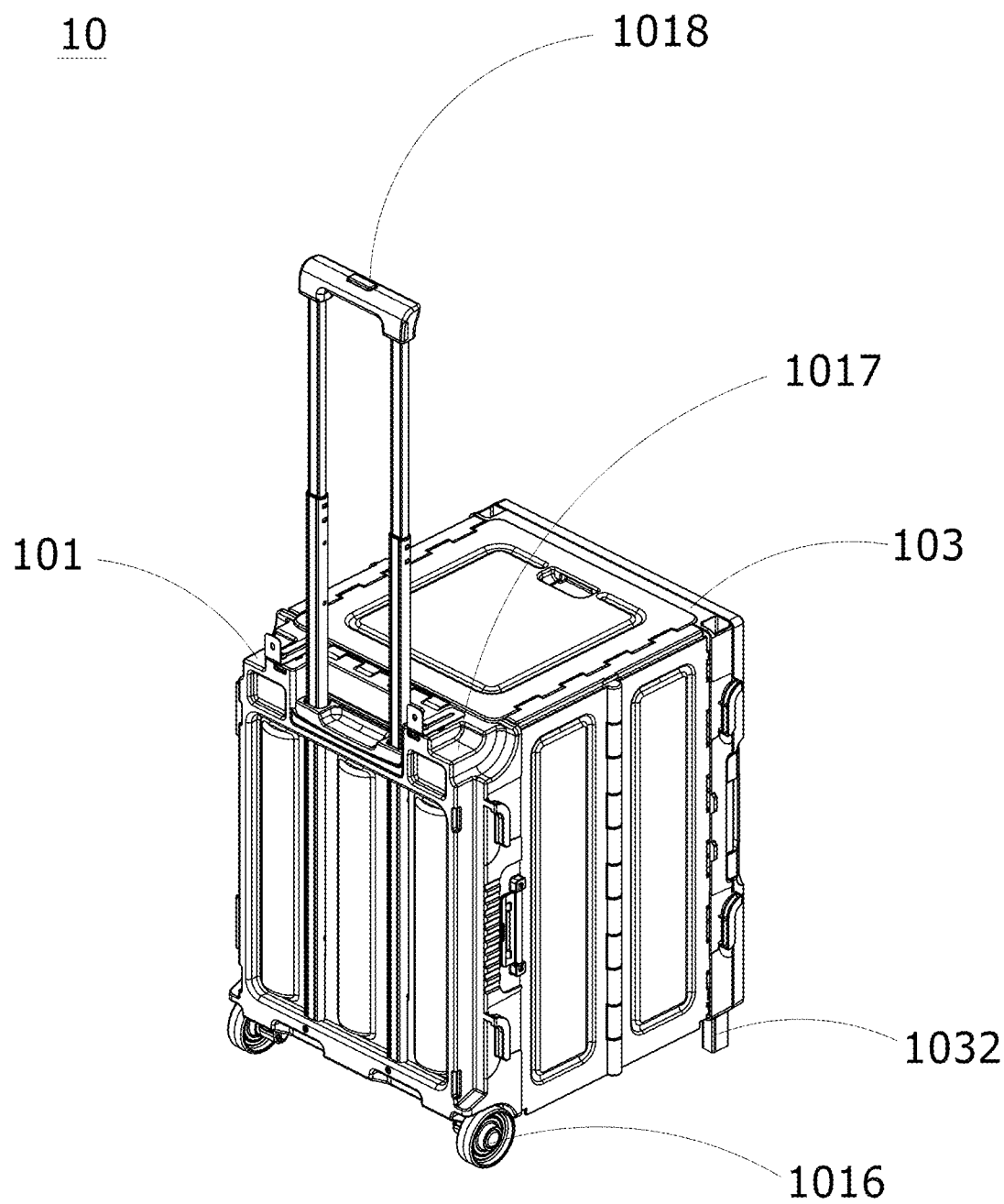
FIG. 23 is a schematic diagram illustrating a folding storage cabinet according to an example implementation of the present disclosure.

FIG. 23 is a schematic diagram illustrating a folding storage cabinet according to an example implementation of the present disclosure. In one implementation, a wheel 1016 is arranged on both sides of the bottom of the back plate 101, and a groove 1017 is formed on both sides of the top of the back plate 101, the groove 1017 is designed to accommodate the wheels of another folding storage cabinet when multiple cabinets are stacked. Furthermore, the back plate 101 is provided with an extendable handle 1018 for a user to hold the handle 1018 and pull it with force. The folding storage cabinet 10 may be easily pulled through the wheels 1016, and after stopping pulling, the fixed rod 1032 of the frame 103 may be used to press against the ground to prevent further sliding of the folding storage cabinet 10.

Figure 24:
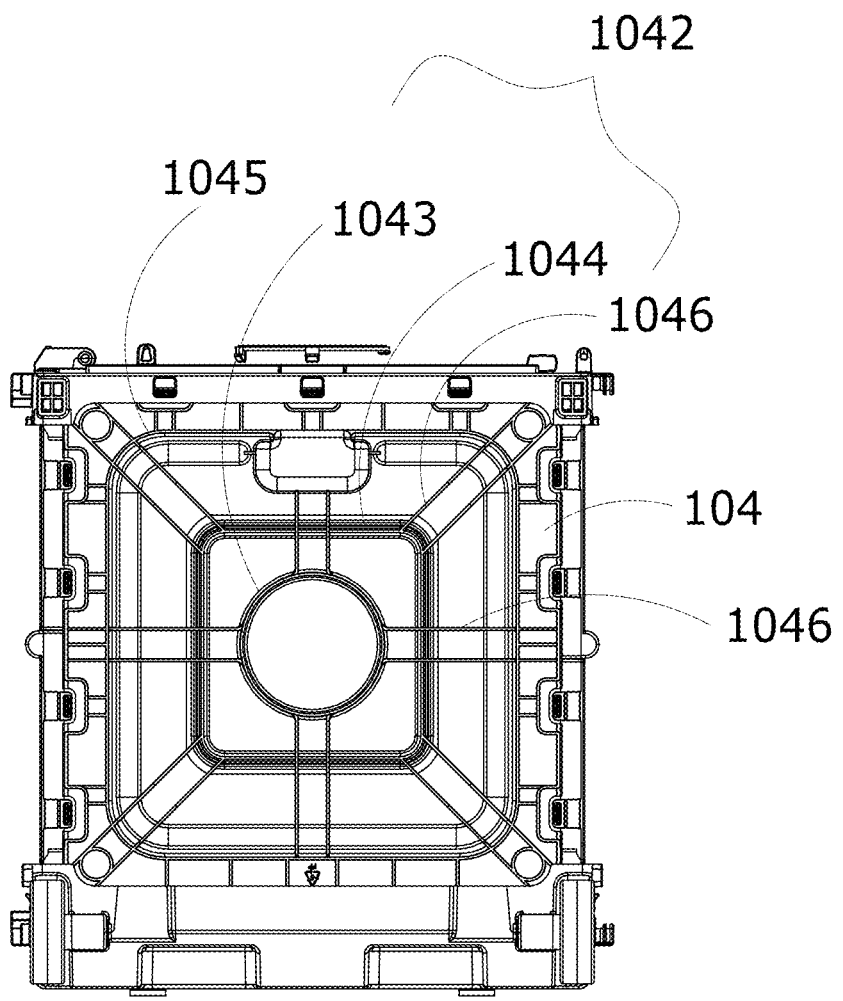
FIG. 24 is a schematic diagram illustrating a folding storage cabinet according to an example implementation of the present disclosure.

FIG. 24 is a schematic diagram illustrating a folding storage cabinet according to an example implementation of the present disclosure. In one implementation, a reinforcing structure 1042 is formed on the inner side of the bottom of the bottom plate 104, and the bottom plate 104 may strengthen the overall structural strength through the reinforcing structure 1042, so as to increase the load capacity. In one implementation, the reinforcing structure 1042 further includes a reinforcing ring 1043, a first reinforcing grid 1044, a second reinforcing grid 1045 and a plurality of reinforcing ribs 1046, where the reinforcing ring 1043 is located inside the first reinforcing grid 1044 and the first reinforcing grid 1044 is located inside the second reinforcing grid 1045. A plurality of reinforcing ribs 1046 are respectively connected with the reinforcing ring 1043 and the first reinforcing grid 1044, arranged in a radial pattern with the reinforcement ring 1043 as the center, and the reinforcing ribs 1046 connected with the reinforcing ring 1043 are arranged radially after passing through the first reinforcing grid 1044.

Figure 25:
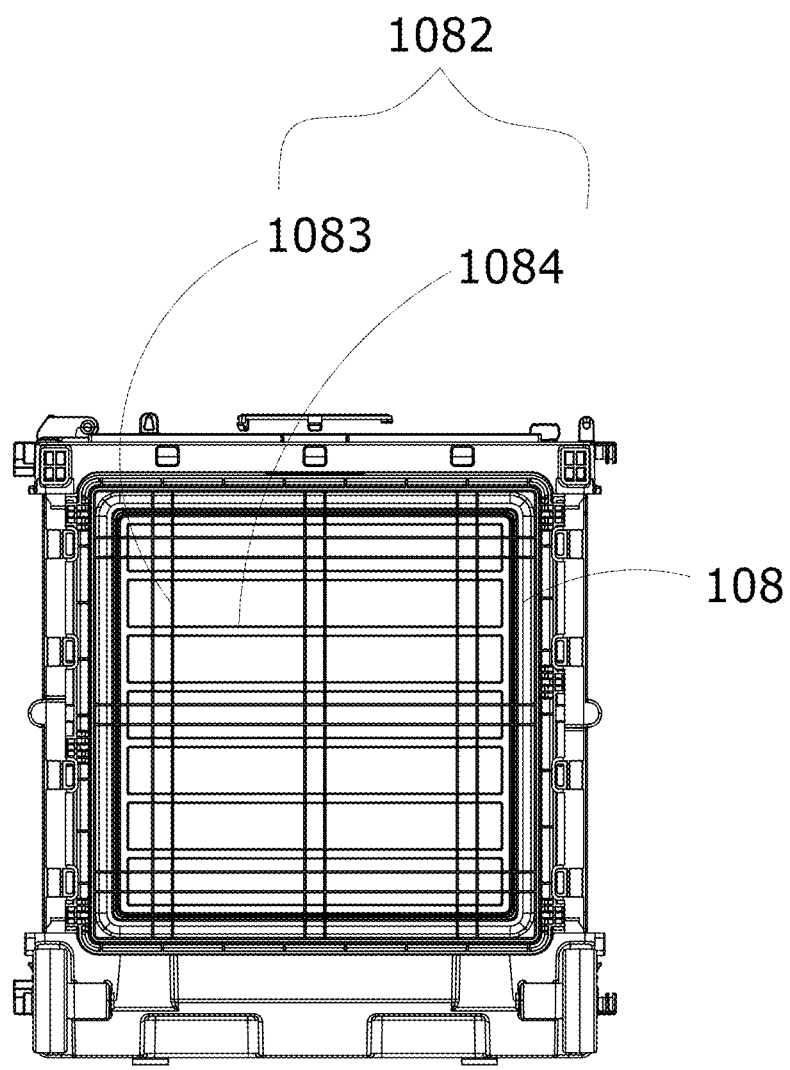
FIG. 25 is a schematic diagram illustrating a folding storage cabinet according to an example implementation of the present disclosure.

FIG. 25 is a schematic diagram illustrating a folding storage cabinet according to an example implementation of the present disclosure. In one implementation, the laminate 108 has a reinforcing structure 1082 formed on the inner side of the bottom of the laminate 108, and the laminate 108 may strengthen the overall structure through the reinforcing structure 1082 to increase the load capacity. In one implementation, the reinforcing structure 1082 further has several longitudinal reinforcing ribs 1083 and several transverse reinforcing ribs 1084, and the longitudinal reinforcing ribs 1083 and the transverse reinforcing ribs 1084 are interconnected with each other to form a mesh-like pattern, and the positions of the longitudinal reinforcing ribs 1083 and the transverse reinforcing ribs 1084 are symmetrical.

Figure 26A:
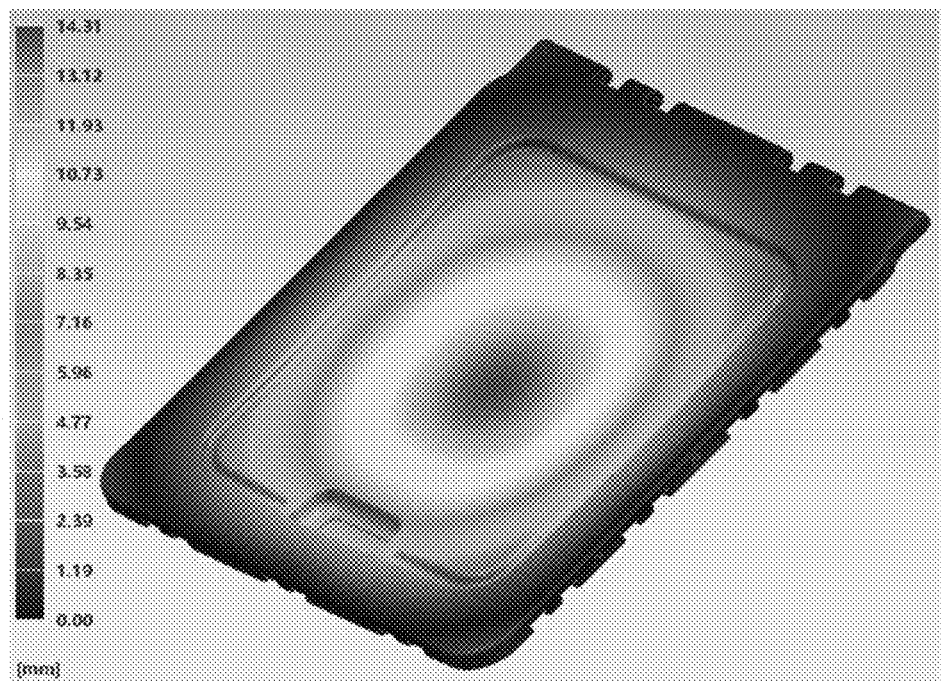
FIG. 26A and FIG. 26 B are deformation distribution diagrams illustrating a bottom plate of an embodiment 1 and a comparative embodiment 1 after applying the same force.
Figure 26B:
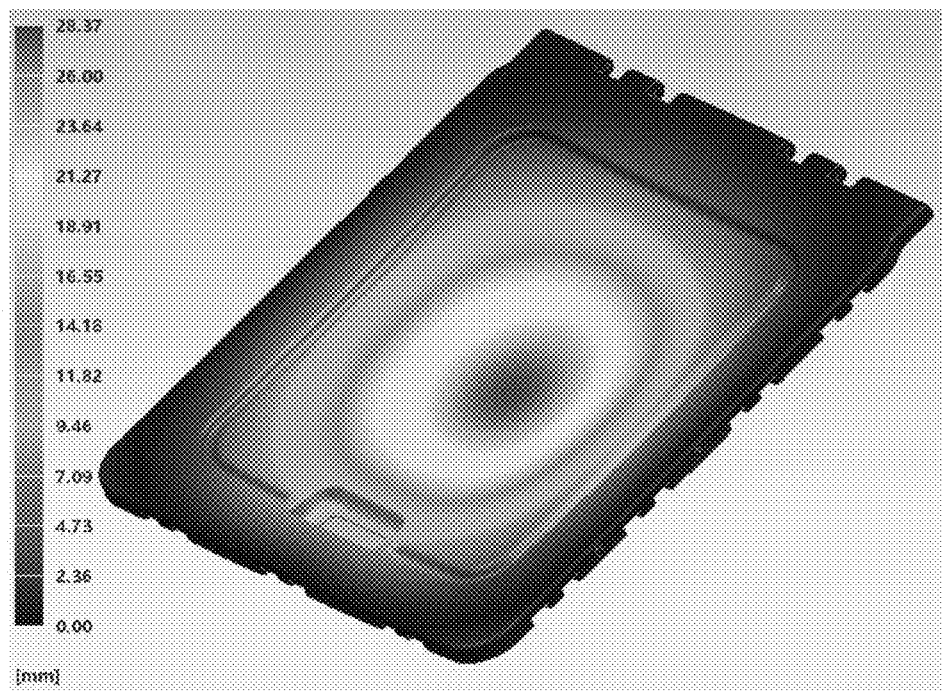

The following are the verification results of the bottom plate and laminate after reinforcement:

Experiments were conducted on embodiment 1 and comparative embodiment 1 to test the compressive strength of the side plates in accordance with the present disclosure. A weight of 30 Kg was applied to the bottom plate of embodiment 1 (referred to the bottom plate 104 of the present disclosure, hereinafter referred to as the bottom plate 200) and the bottom plate 300 of comparative embodiment 1, respectively. The analysis was performed using computer-aided engineering (CAE) simulation methods. The results are shown in FIG. 26A representing embodiment 1 and FIG. 26 B representing comparative embodiment 1. Where the difference between the bottom plate 300 of comparative embodiment 1 and the bottom plate 200 of embodiment 1 is that the bottom plate 300 of comparative embodiment 1 does not include the integral reinforcing structure contained in the reinforcing structure 1042 of the present disclosure.

TABLE 1

The maximum deformation value of embodiment 1 and comparative embodiment 1.

|  | Embodiment 1 | Comparative embodiment 1 |
|---|---|---|
| Maximum deformation value (mm) | 14.31 | 28.37 |

Referring to Table 1, the maximum deformation value of the bottom plate 300 in comparative embodiment 1 is 1.98 times higher than the bottom plate 200 in embodiment 1. This indicates that in embodiment 1, compared to comparative embodiment 1, the maximum deformation value of the bottom plate 200 is reduced, so that the compression resistance is effectively improved.

Figure 27A:
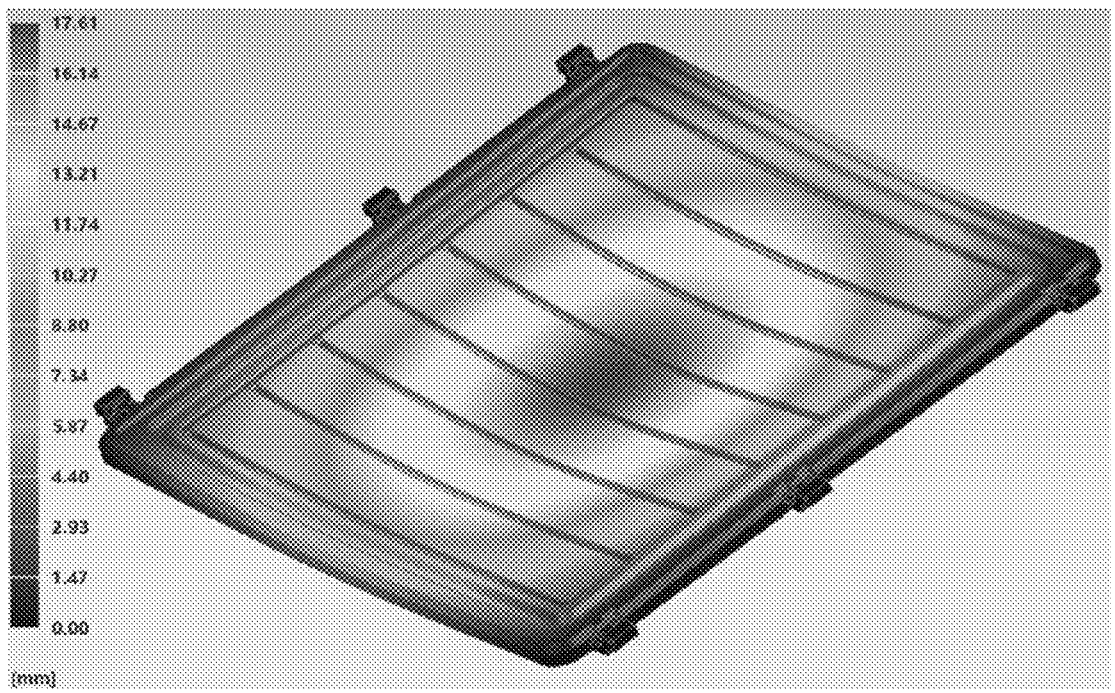
FIG. 27A and FIG. 27 B are deformation distribution diagrams illustrating a laminate of an embodiment 1 and a comparative embodiment 1 after applying the same force.
Figure 27B:
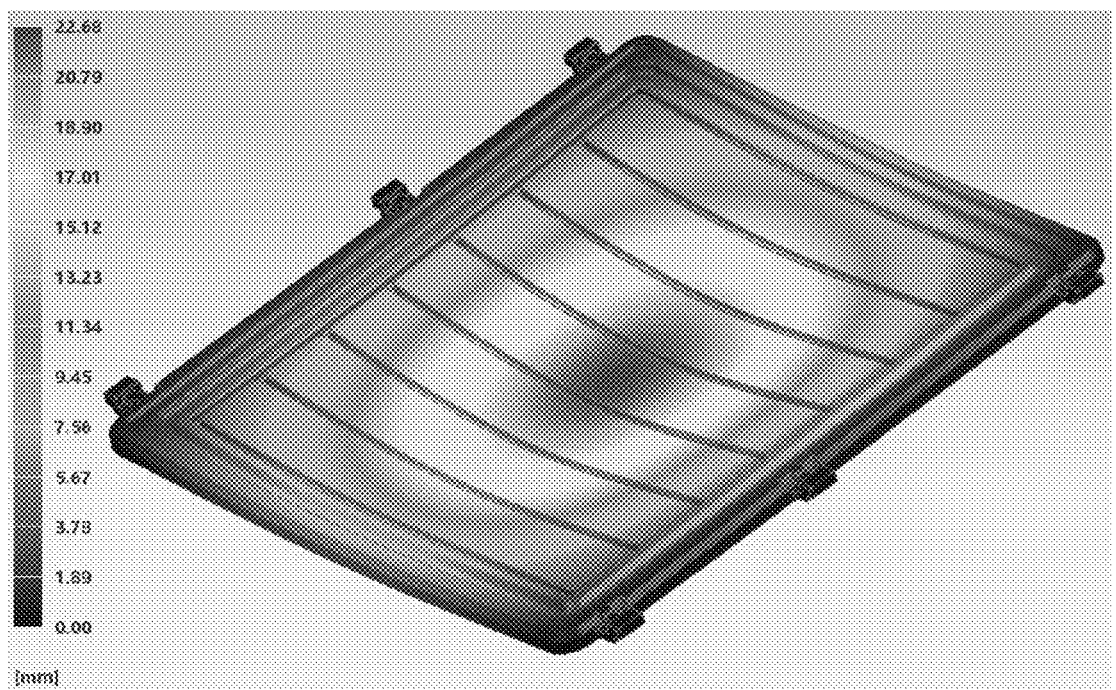

The laminate of embodiment 1 of the present disclosure and comparative embodiment 1 were tested for compressive strength, and the laminate of embodiment 1 (referring to the laminate 108 of the present disclosure, hereinafter referred to as laminate 400) and the laminate 500 of comparative embodiment 1 were respectively weighed with 15 Kg, and then analyzed by CAE simulation calculation method. The results are shown in FIG. 27A representing embodiment 1 and FIG. 27 B representing comparative embodiment 1. The difference between the laminate 500 of Comparative Example 1 and the laminate 400 of Embodiment 1 is that the laminate 500 does not include the integral reinforcing structure contained in the reinforcing structure 1082 of the present disclosure.

TABLE 2

The maximum deformation value of embodiment 1 and comparative embodiment 1.

|  | Embodiment 1 | Comparative embodiment 1 |
|---|---|---|
| Maximum deformation value (mm) | 17.61 | 22.68 |

Referring to Table 2, the maximum deformation value of the laminate 500 in comparative embodiment 1 is 1.28 times greater than the laminate 400 in embodiment 1. This indicates that in embodiment 1, compared to comparative embodiment 1, the maximum deformation value of the laminate 400 is reduced, so that the compression resistance is effectively improved.

Figure 28:
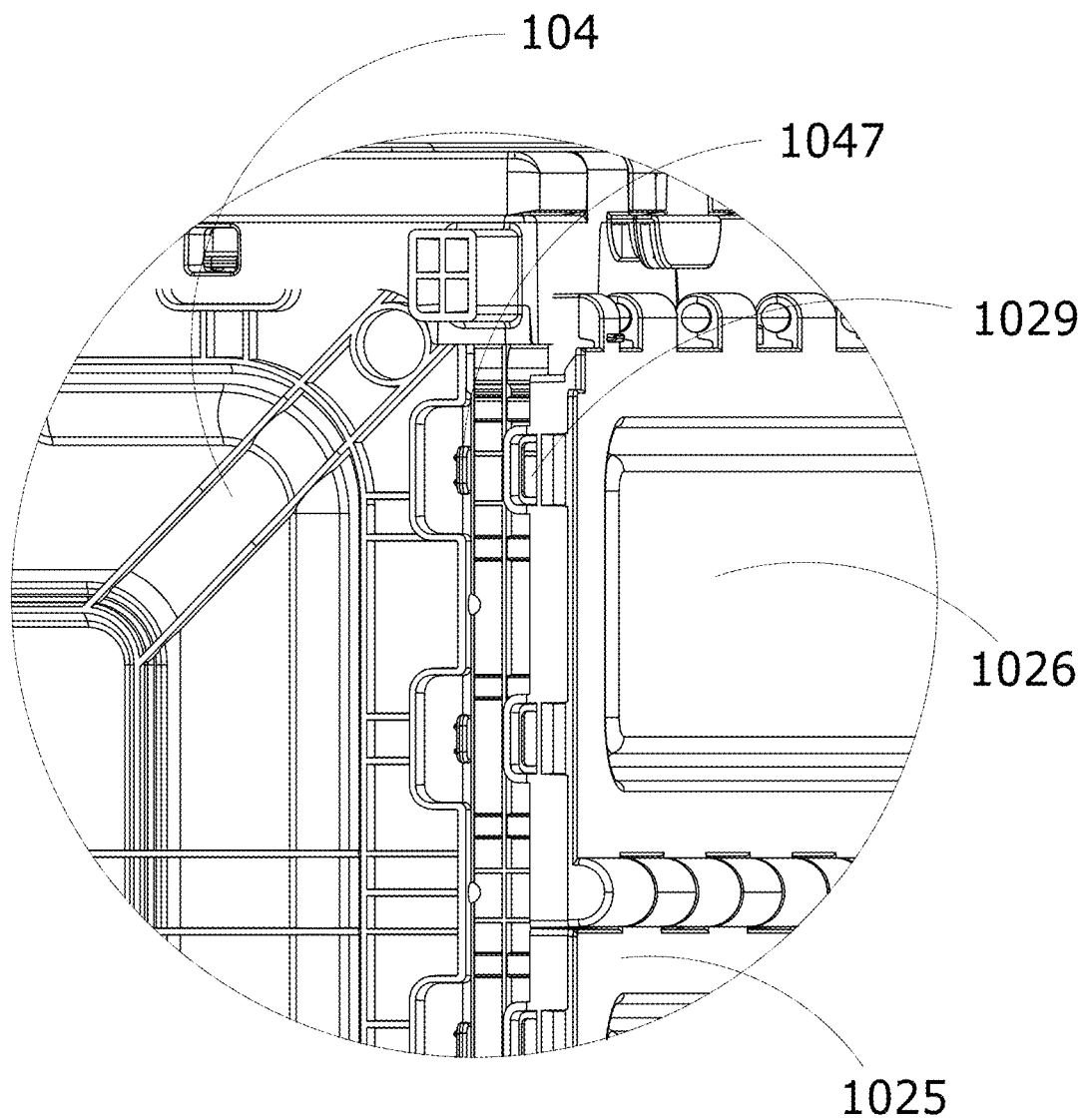
FIG. 28 is a schematic diagram illustrating a state before implementation of the folding storage cabinet according to an example implementation of the present disclosure.
Figure 29:
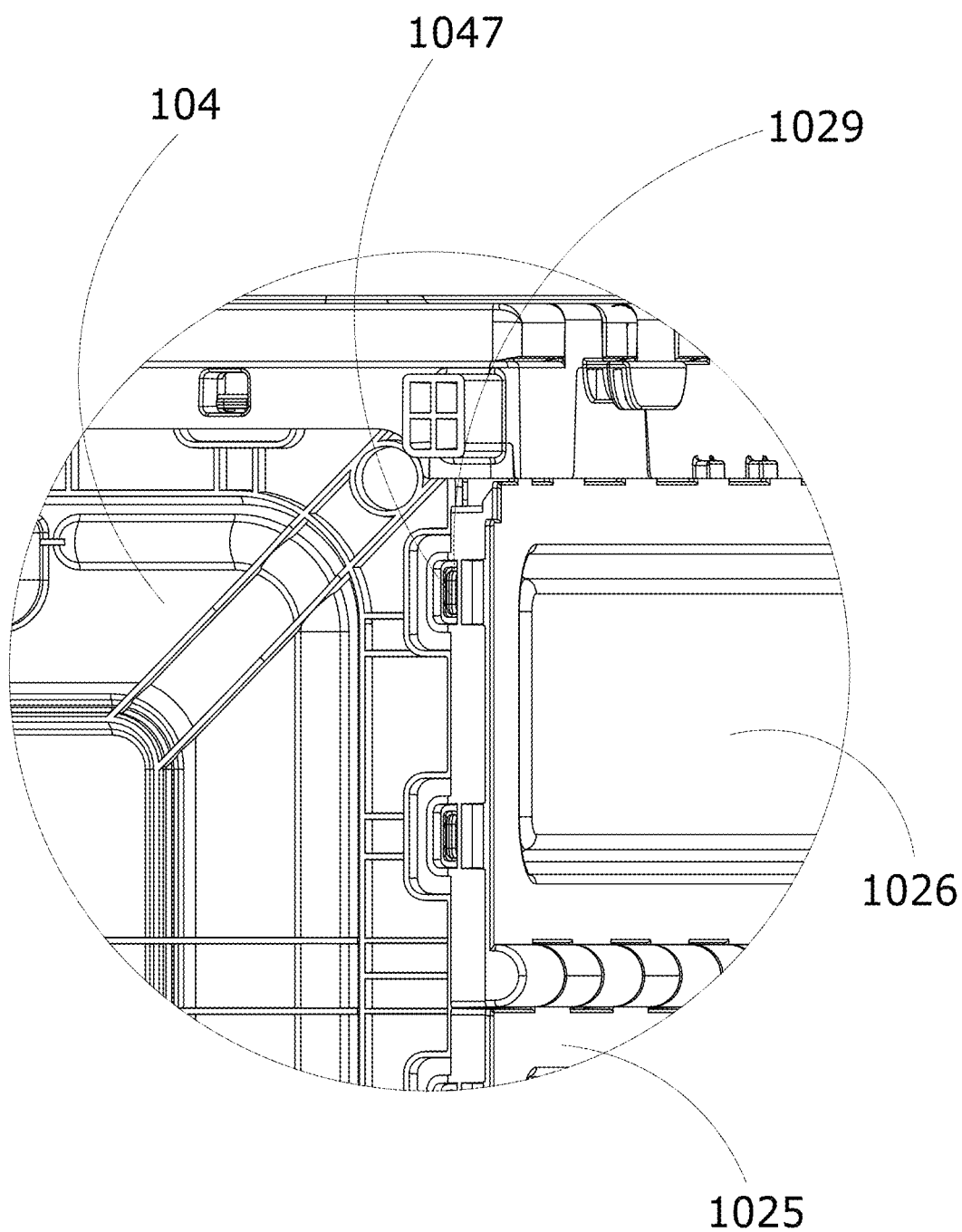
FIG. 29 is a schematic diagram illustrating a state after implementation of the folding storage cabinet according to an example implementation of the present disclosure.

Referring to FIG. 28 and FIG. 29, illustrating the state before and after implementation of the folding storage cabinet according to an example implementation of the present disclosure. Two opposite sides of the bottom plate 104 each formed with at least one fixing part 1047, and the fixing part 1047 may be formed into a hook-and-claw component, while at least one corresponding fixing part 1029 is formed on one side of the first side plate 1025 corresponding to the fixing parts 1047 and another at least one corresponding fixing part 1029 is formed on one side of the second side plate 1026 corresponding to the fixing parts 1047. The corresponding fixing part 1029 may be formed into a groove-shaped structure to fix the fixing part 1047, so that the bottom plate 104 may be fixed to the corresponding fixing part 1029 through the fixing part 1047 to provide a stable support when the bottom plate 104 is loaded with heavy objects.

Figure 30:
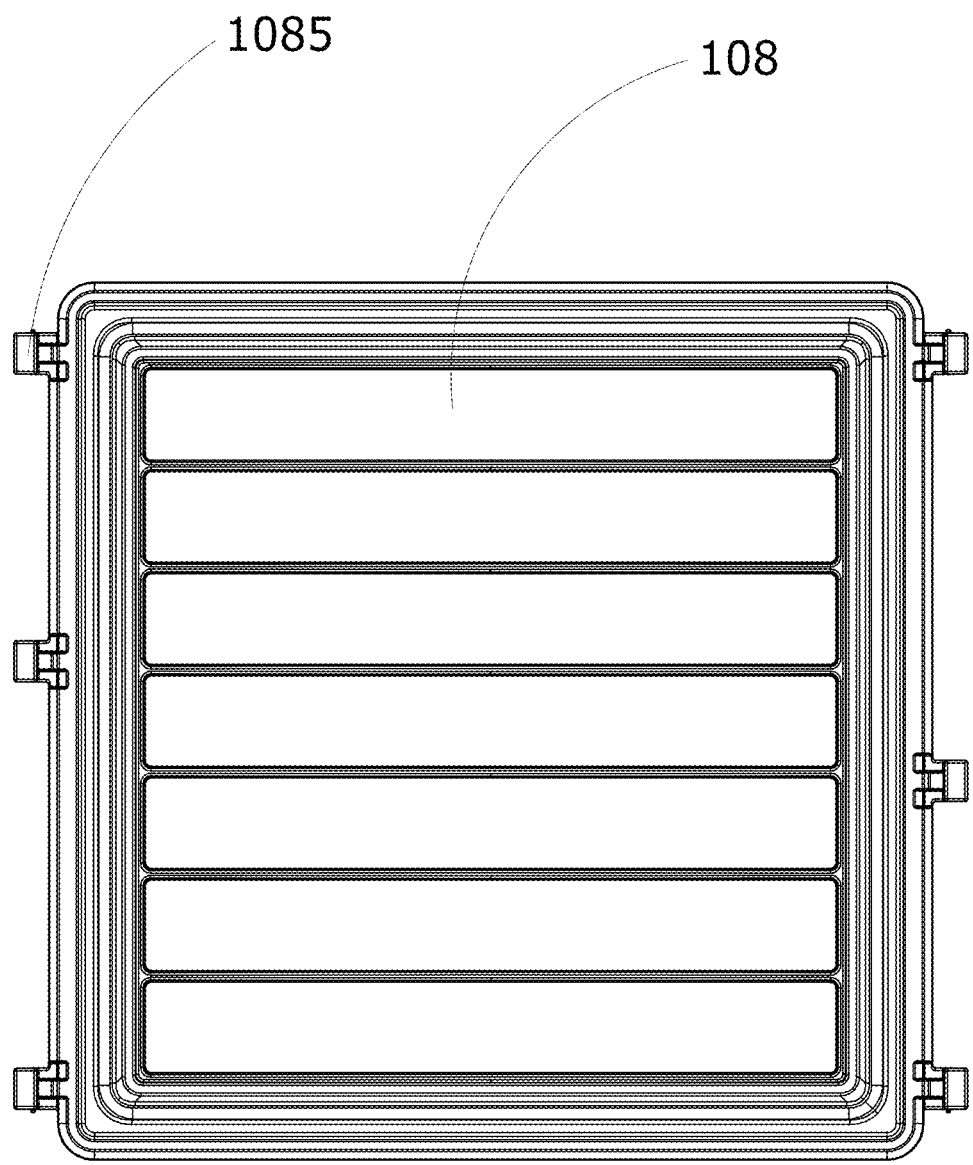
FIG. 30 is a schematic diagram illustrating a laminate structure of the folding storage cabinet according to an example implementation of the present disclosure.
Figure 31:
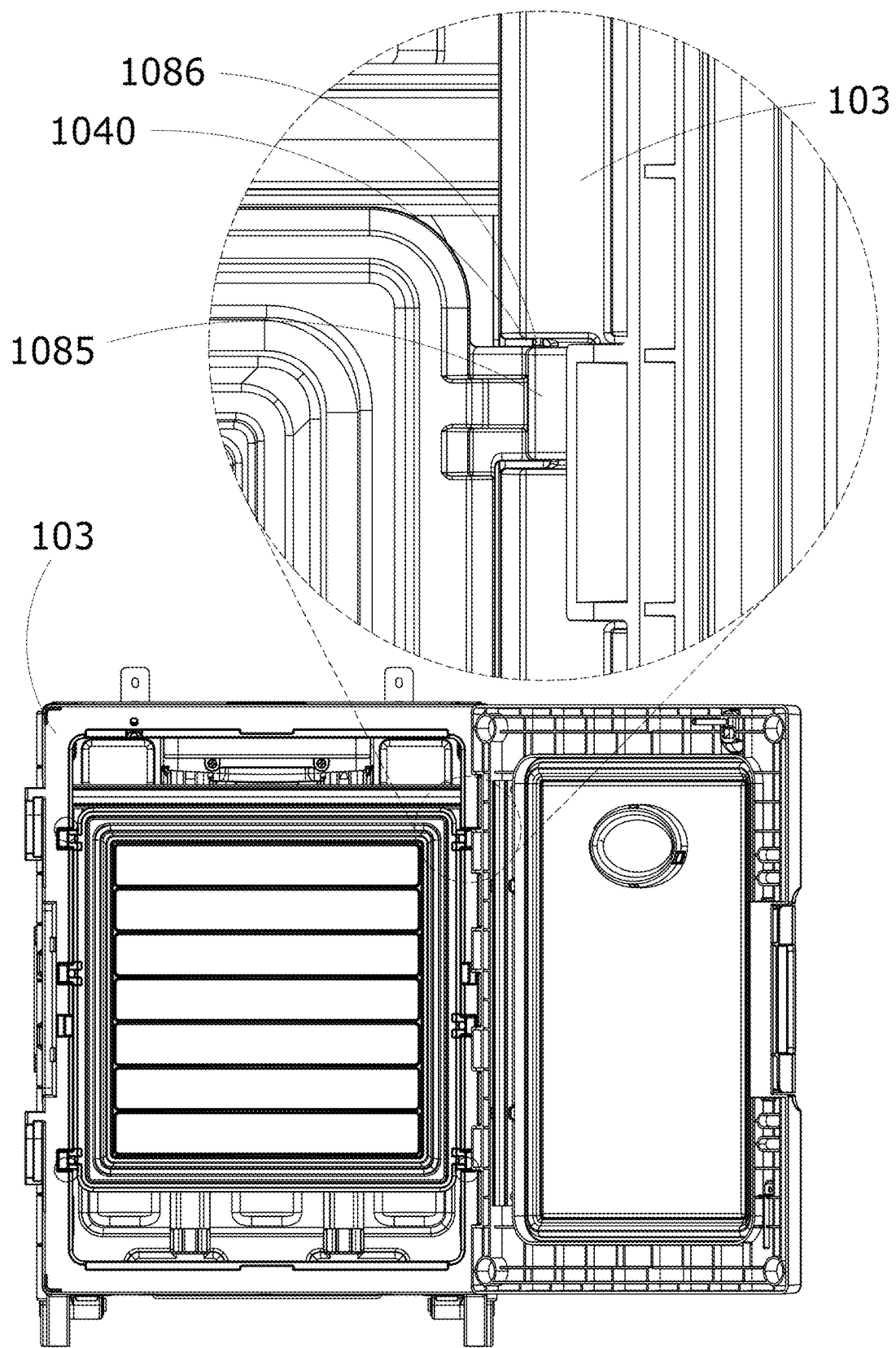
FIG. 31 is a schematic diagram illustrating a state after implementation of the folding storage cabinet according to an example implementation of the present disclosure.

Referring to FIG. 30 and FIG. 31 are the schematic diagrams illustrating a folding storage cabinet according to an example implementation of the present disclosure. The laminate 108 has at least one or more fixing tenons 1085 on each opposite side. The frame 103 has a tenon fixing groove 1040 formed at a position correspond to the fixing tenons 1085. When the laminate 108 is not in use, the laminate 108 may be fixed in the tenon fixing groove 1040 through the fixing tenons 1085, so that the laminate 108 may be stored in an upright position correspond to the frame 103. In one implementation, at least one of the fixed tenons 1085 may be further formed with a protruding part 1086, the protruding part 1086 may increase the tightness of the fixing tenons 1085 into the tenon fixing groove 1040. This provides a more stable fixation of the laminate 108 on the frame 103.

Figure 32:
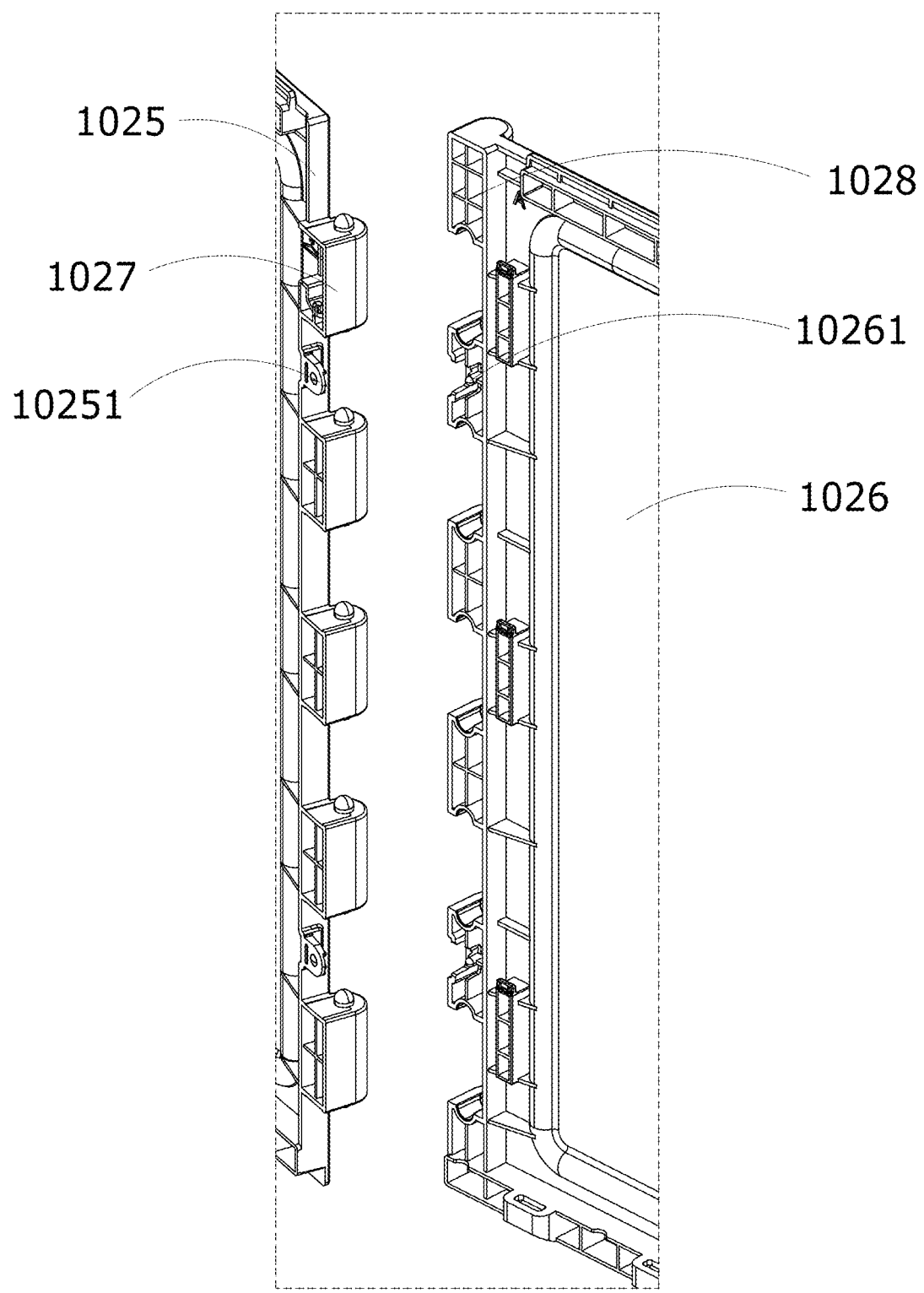
FIG. 32 is a structural schematic diagram illustrating a first side plate and a second side plate of the folding storage cabinet according to an example implementation of the present disclosure.
Figure 33:
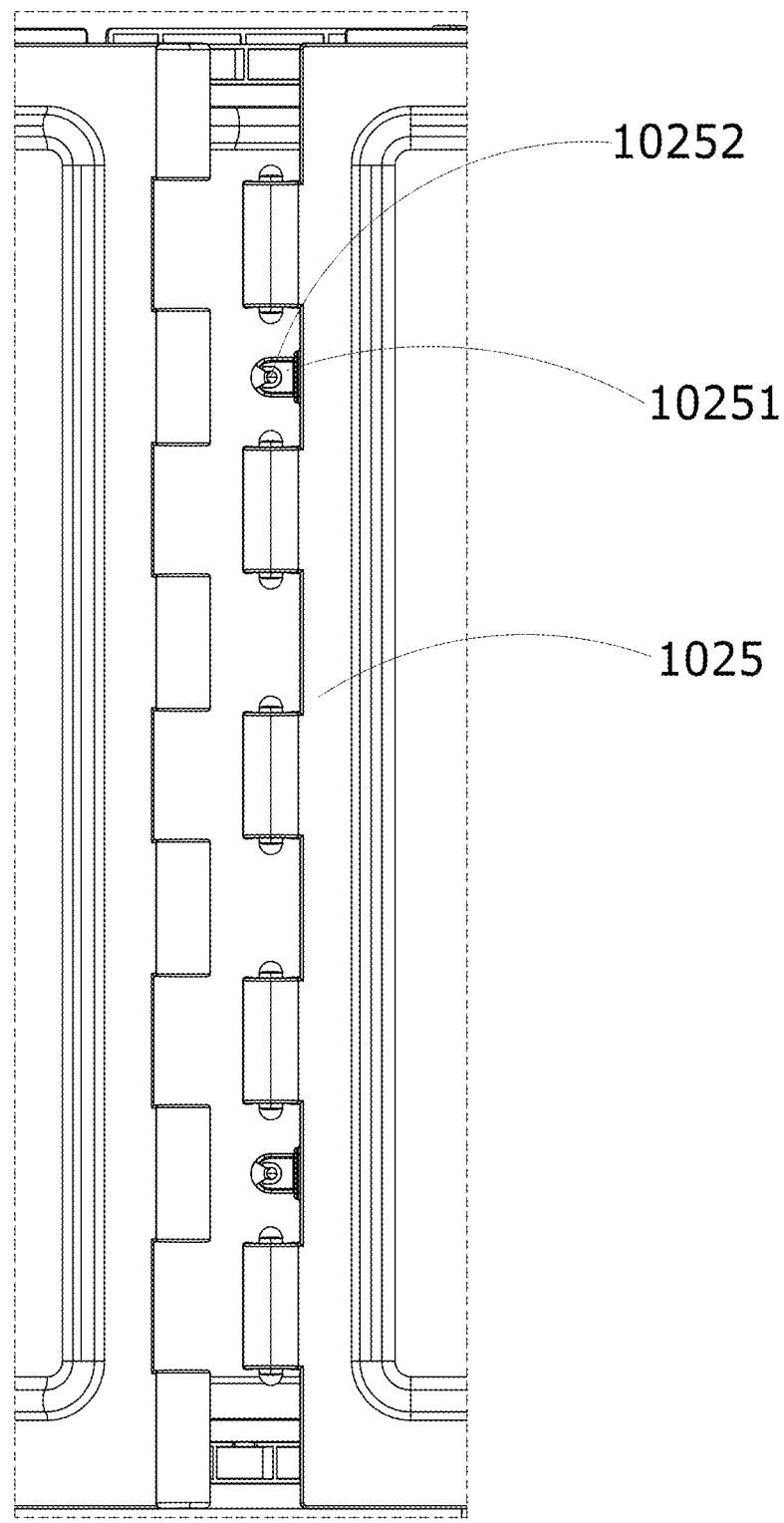
FIG. 33 is a structural schematic diagram illustrating a first side plate and a second side plate of the folding storage cabinet according to an example implementation of the present disclosure.
Figure 34:
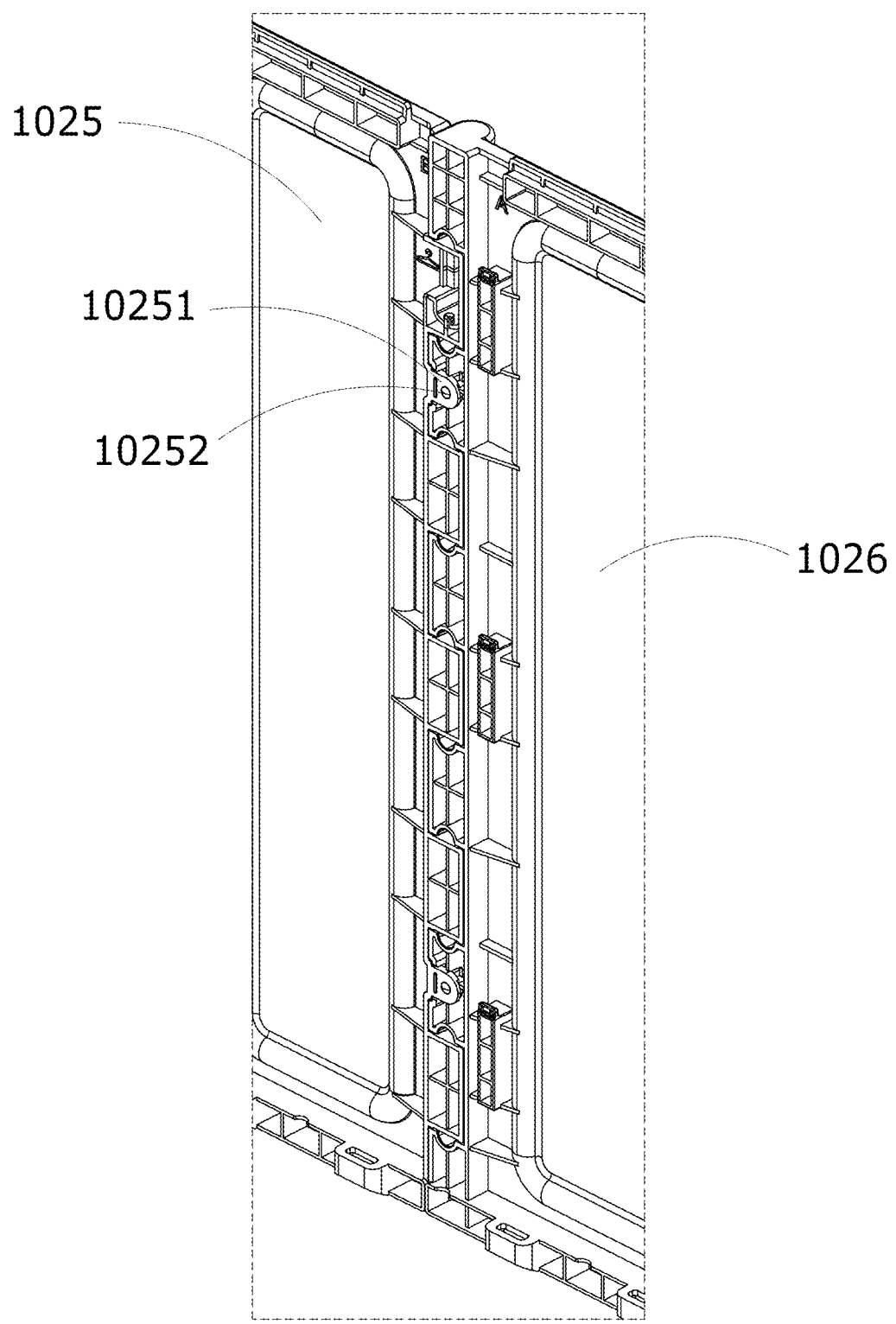
FIG. 34 is a schematic diagram illustrating a state after implementation of the folding storage cabinet according to an example implementation of the present disclosure.

Referring to FIG. 32 to FIG. 34 are the schematic diagrams illustrating a folding storage cabinet according to an example implementation of the present disclosure. Please refer to FIGS. 1, 5, and 17. The first side plate 1025 and the second side plate 1026 shown in FIG. 32. are formed with the third side plate pivot part 1027 and the fourth side plate pivot part 1028. One side of the first side plate 1025 formed with the third side plate pivot part 1027 is formed with at least one anti-bending component 10251, and the second side plate 1026 formed with the fourth side plate pivot part 1028 is formed at least one more top pillar 10261. The anti-bending component 10251 is formed with a curved slotted hole 10252, which may be used for the top pillar 10261 to press against. When the first side plate 1025 and the second side plate 1026 are connected together, the top pillar 10261 will be snap into the slotted hole 10252 of the anti-bending component 10251. Thus, when the top plate 105, the bottom plate 104, and the laminate 108 of the folding storage cabinet 10 have completed the storage process, the storage space 107 of the folding storage cabinet 10 will be in a state without any object providing support. After the top pillar 10261 is inserted into the slotted hole 10252 of the anti-bending component 10251, it may provide improved resistance to bending for the connected first side plate 1025 and second side plate 1026, as shown in FIG. 34. It prevents the first side plate 1025 and the second side plate 1026 from experiencing bending deformation when subjected to minor external forces in a state where the storage space 107 is without any object providing support.

From the present disclosure, it is manifested that various techniques may be used for implementing the concepts described in the present disclosure without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A folding storage cabinet, comprising:
   a frame;
   a back plate located at an opposite side of the frame, a bottom portion of one of the frame and the back plate formed with at least one bottom pivot part, a top portion of other one of the frame and the back plate formed with at least one top pivot part;

two folding side plates, each located between the frame and the back plate, pivotally connected to the back plate and the frame, such that the two folding side plates are foldable in a flat manner;

a bottom plate, one side of the bottom plate formed with at least one bottom plate pivot part, and the bottom plate being pivotally connected to the at least one bottom pivot part through the at least one bottom plate pivot part; and a top plate, comprising:
  a cover plate, one side of the cover plate formed with at least one first cover plate pivot part, two other opposite sides each formed with at least one second cover plate pivot part, and the at least one first cover plate pivot part pivotally connected to the at least one top pivot part; and
  two wing plates, one side of each of the two wing plates corresponding to the two second cover plate pivot parts of the cover plate and formed with at least one wing plate pivot part, and the at least one wing plate pivot part pivotally connected to the at least one second cover plate pivot part to allow the two wing plates to be folded towards the cover plate, such that the top plate is foldable through the at least one first cover plate pivot part and the at least one top pivot part to the other one of the frame and the back plate.

2. The folding storage cabinet according to claim 1, further comprising a door plate, one side of the door plate formed with at least one door plate pivot part, one side of the frame facing the at least one door plate pivot part formed with at least one second frame pivot part, and the at least one door plate pivot part correspondingly and pivotally connected with the at least one second frame pivot part, such that the door plate opens and closes relative to the frame.

3. The folding storage cabinet according to claim 1, wherein each of the two folding side plates comprises a first side plate and a second side plate, at least one first side plate pivot part is formed on one side of the first side plate, at least one third side plate pivot part is formed on another side of the first side plate, at least one second side plate pivot part is formed on one side of the second side plate, at least one fourth side plate pivot part is formed on another side of the second side plate corresponding to the at least one third side plate pivot part, and the at least one third side plate pivot part is correspondingly and pivotally connected to the at least one fourth side plate pivot part, such that the first side plate is foldable in a flat manner against the second side plate.

4. The folding storage cabinet according to claim 1, wherein at least one first fixing piece and at least one second fixing piece are formed on a side of the folding storage cabinet, the at least one first fixing piece is on the back plate, the at least one second fixing piece is on the frame, at least one third fixing piece and at least one fourth fixing piece are formed on another side of the folding storage cabinet, the at least one third fixing piece is on the back plate, the at least one fourth fixing piece is on the frame, and the first fixing piece and the second fixing piece of the folding storage cabinet are configured to assemble with a third fixing piece and a fourth fixing piece of another folding storage cabinet, such that a plurality of folding storage cabinets is stably arranged side by side.

5. The folding storage cabinet according to claim 2, wherein:
  the door plate is formed with a latch hole, the frame is formed with a first through hole corresponding to the latch hole, and the top plate is formed with a second through hole corresponding to the first through hole, the door plate further comprises a latch, one end of the latch is formed with a lock hole, and the latch is configured to pass through the first through hole and the second through hole after being inserted into the latch hole, to prevent the top plate from being lifted by the latch, and
  a corresponding lock hole is formed at a position on the frame corresponding to the lock hole, and the latch hole of the latch and the corresponding lock hole are configured to be secured with a lock to prevent the latch from being pulled out.

6. The folding storage cabinet according to claim 1, further comprising at least one laminate, wherein each of two sides of the at least one laminate is formed with a plurality of top supporting parts, each of the two folding side plates is formed with a plurality of corresponding top supporting parts corresponding to the plurality of top supporting parts, and the at least one laminate is configured to pressed against the plurality of corresponding top supporting parts through the plurality of top supporting parts at the two sides, such that the at least one laminate is horizontally positioned between the two folding side plates.

7. The folding storage cabinet according to claim 2, further comprising a hanging rod, wherein:
  two ends of the hanging rod are each formed with a fixing hole, the two folding side plates are each formed with a fixed part corresponding to one of the two ends of the hanging rod, and the hanging rod is configured to be fixed to the fixed part through the fixing hole on both of the two ends of the hanging rod, such that the hanging rod is horizontally positioned between the two folding side plates; and
  the door plate comprises a slot for clamping the hanging rod.

8. The folding storage cabinet according to claim 1, wherein:
  each of two bottom sides of the back plate comprises a wheel, and
  each of two top sides of the back plate comprises a groove, and the groove is configured to accommodate a wheel of another folding storage cabinet when a plurality of the folding storage cabinets are stacked.

9. The foldable storage cabinet according to claim 1, wherein:
  in a case that the one of the frame and the back plate and the other one of the frame and the back plate are identical, the at least one top pivot part and the at least one bottom pivot part are located in the same one of the frame and the back plate, and
  in a case that the one of the frame and the back plate and the other one of the frame and the back plate are different, the at least one top pivot part is located in the one of the frame and the back plate, and the at least one bottom pivot part is located in other one of the frame and the back plate.

10. The foldable storage cabinet according to claim 1, wherein:
  when the top plate is folded, the two wing plates are folded towards the cover plate, such that the top plate is accommodated in the other one of the frame and the back plate, and
  when the top plate covers a storage space of the folding storage cabinet, the two wing plates are unfolded, such that the top plate rests on the two folding side plates.

* * * * *